United States Patent
Mayfield et al.

(10) Patent No.: US 11,084,066 B2
(45) Date of Patent: Aug. 10, 2021

(54) SYSTEM COMPRISING A PORTABLE SWITCHING DEVICE FOR USE WITH A PORTABLE ELECTRONIC DEVICE

(71) Applicant: GUI GLOBAL PRODUCTS, LTD., Houston, TX (US)

(72) Inventors: Walter G. Mayfield, Houston, TX (US); Daniel Martin Valdez, Kingwood, TX (US)

(73) Assignee: GUI GLOBAL PRODUCTS, LTD., Houston, TX (US)

( * ) Notice: Subject to any disclaimer, the term of this patent is extended or adjusted under 35 U.S.C. 154(b) by 0 days.

(21) Appl. No.: 17/214,616

(22) Filed: Mar. 26, 2021

(65) Prior Publication Data

US 2021/0213487 A1 Jul. 15, 2021

Related U.S. Application Data

(63) Continuation of application No. 16/817,330, filed on Mar. 12, 2020, which is a continuation of application
(Continued)

(51) Int. Cl.
*B08B 1/00* (2006.01)
*A45C 11/00* (2006.01)
(Continued)

(52) U.S. Cl.
CPC ............... *B08B 1/006* (2013.01); *A45C 11/00* (2013.01); *B08B 1/002* (2013.01); *G06F 1/32* (2013.01);
(Continued)

(58) Field of Classification Search
CPC ......... B08B 1/006; B08B 1/002; A45C 11/00; G06F 1/32; H04M 1/21; H04M 1/0266; H04B 1/3816
See application file for complete search history.

(56) References Cited

U.S. PATENT DOCUMENTS 2,264,746 A 12/1941 Ellwood
3,726,091 A 4/1973 Tontini
(Continued)

FOREIGN PATENT DOCUMENTS

CN 201114710 Y 9/2008
EP 0517497 A2 9/1992
(Continued)

OTHER PUBLICATIONS

Motorola, MC75A Enterprise Digital Assistant User Guide, 72E-133503-01 Rev. A, 232 pp. (Mar. 2010).
(Continued)

*Primary Examiner* — Khai M Nguyen
(74) *Attorney, Agent, or Firm* — Mossman Kumar & Tyler PC

(57) ABSTRACT

A lens and/or a view screen of an electronic device having at least one case can be cleaned by wiping the view screen with a cleaning component wherein the cleaning component is configured to selectively couple to the at least one case or some other substrate using a magnetic attractive force. The cleaning devices may have secondary applications such as securing fly fishing lures, activating or deactivating a device having a magnetic switch, or preventing sunglasses from sinking. They may also be manufactured without a cleaning component for use with the secondary applications.

17 Claims, 13 Drawing Sheets

Related U.S. Application Data

No. 16/704,989, filed on Dec. 5, 2019, now Pat. No. 10,625,307, which is a continuation of application No. 16/698,223, filed on Nov. 27, 2019, now Pat. No. 10,589,320, which is a continuation of application No. 16/502,935, filed on Jul. 3, 2019, now Pat. No. 10,493,496, which is a continuation of application No. 16/460,770, filed on Jul. 2, 2019, now Pat. No. 10,562,077, which is a continuation of application No. 16/388,691, filed on Apr. 18, 2019, now Pat. No. 10,583,464, which is a continuation of application No. 16/041,594, filed on Jul. 20, 2018, now Pat. No. 10,272,474, which is a continuation of application No. 15/851,952, filed on Dec. 22, 2017, now Pat. No. 10,259,020, which is a continuation of application No. 15/852,000, filed on Dec. 22, 2017, now Pat. No. 10,259,021, which is a continuation of application No. 15/816,331, filed on Nov. 17, 2017, now Pat. No. 10,259,019, which is a continuation of application No. 15/597,005, filed on May 16, 2017, now abandoned, which is a continuation of application No. 14/343,665, filed as application No. PCT/US2012/049562 on Aug. 3, 2012, now abandoned.

(60) Provisional application No. 61/661,090, filed on Jun. 18, 2012, provisional application No. 61/619,229, filed on Apr. 2, 2012, provisional application No. 61/592,344, filed on Jan. 30, 2012, provisional application No. 61/576,834, filed on Dec. 16, 2011, provisional application No. 61/569,093, filed on Dec. 9, 2011, provisional application No. 61/568,031, filed on Dec. 7, 2011, provisional application No. 61/561,087, filed on Nov. 17, 2011, provisional application No. 61/555,310, filed on Nov. 3, 2011, provisional application No. 61/515,752, filed on Aug. 5, 2011.

(51) Int. Cl.
 *G06F 1/32* (2019.01)
 *H04M 1/21* (2006.01)
 *H04B 1/3816* (2015.01)
 *H04M 1/02* (2006.01)

(52) U.S. Cl.
 CPC ............. *H04M 1/21* (2013.01); *H04B 1/3816* (2013.01); *H04M 1/0266* (2013.01)

(56) References Cited

U.S. PATENT DOCUMENTS

| | | |
|---|---|---|
| 5,946,121 A | 8/1999 | Jiang et al. |
| 6,076,790 A | 6/2000 | Richter |
| 6,809,774 B1 | 10/2004 | Yamazaki et al. |
| 7,012,802 B2 | 3/2006 | Nakajima et al. |
| 7,130,654 B2 | 10/2006 | Cho |
| 7,161,578 B1 | 1/2007 | Schneider |
| 7,195,362 B2 | 3/2007 | Kumagai |
| 7,211,986 B1 | 5/2007 | Flowerdew et al. |
| 7,251,197 B2 | 7/2007 | Yoshida et al. |
| 7,548,040 B2 | 6/2009 | Lee et al. |
| 7,620,195 B2 | 11/2009 | Bengtsson et al. |
| 7,627,289 B2 | 12/2009 | Huddart |
| 7,631,811 B1 | 12/2009 | Brown |
| 7,664,287 B2 | 2/2010 | Neu et al. |
| 7,761,091 B2 | 7/2010 | Dunn et al. |
| 8,064,194 B2 | 11/2011 | Szeremeta |
| 8,086,281 B2 | 12/2011 | Rabu et al. |
| 8,234,509 B2 | 7/2012 | Gioscia et al. |
| 8,688,037 B2 | 4/2014 | Chatterjee et al. |
| 8,737,650 B2 | 5/2014 | Pedersen |
| 10,583,464 B1 | 3/2020 | Mayfield et al. |
| 2003/0005558 A1 | 1/2003 | Wong |
| 2003/0164895 A1 | 9/2003 | Viinikanoja et al. |
| 2004/0227998 A1 | 11/2004 | Aoshima et al. |
| 2005/0107131 A1 | 5/2005 | Abramov |
| 2005/0284904 A1 | 12/2005 | Knapp et al. |
| 2006/0041746 A1 | 2/2006 | Kirkup et al. |
| 2006/0111044 A1 | 5/2006 | Keller |
| 2006/0152576 A1 | 7/2006 | Kiessling et al. |
| 2006/0166715 A1 | 7/2006 | Van et al. |
| 2006/0238281 A1 | 10/2006 | Steinberg |
| 2007/0135185 A1 | 6/2007 | Dvorak et al. |
| 2007/0145255 A1 | 6/2007 | Nishikawa et al. |
| 2008/0012706 A1 | 1/2008 | Mak-Fan et al. |
| 2008/0070501 A1 | 3/2008 | Wyld |
| 2008/0076489 A1 | 3/2008 | Rosener et al. |
| 2008/0085617 A1 | 4/2008 | Bevirt |
| 2008/0103637 A1 | 5/2008 | Bliven et al. |
| 2008/0132168 A1 | 6/2008 | Segev et al. |
| 2008/0132293 A1 | 6/2008 | Gundlach et al. |
| 2008/0136369 A1 | 6/2008 | Klemenz et al. |
| 2008/0152182 A1 | 6/2008 | Bevirt et al. |
| 2008/0157110 A1 | 7/2008 | Huang et al. |
| 2008/0166005 A1 | 7/2008 | Terlizzi et al. |
| 2008/0167088 A1 | 7/2008 | Rabu et al. |
| 2008/0168286 A1 | 7/2008 | Tupman |
| 2008/0244847 A1 | 10/2008 | Richter et al. |
| 2009/0014105 A1 | 1/2009 | Shattuck |
| 2009/0078478 A1 | 3/2009 | Newman |
| 2009/0091708 A1 | 4/2009 | Greene |
| 2009/0124308 A1 | 5/2009 | Lee |
| 2010/0011524 A1* | 1/2010 | Roeback ............. B08B 1/00 15/105 |
| 2010/0124040 A1 | 5/2010 | Diebel et al. |
| 2010/0195860 A1 | 8/2010 | Becker |
| 2010/0227642 A1 | 9/2010 | Kim et al. |
| 2010/0298032 A1 | 11/2010 | Lee et al. |
| 2011/0117851 A1 | 5/2011 | Kim |
| 2011/0151941 A1 | 6/2011 | Chan |
| 2011/0167287 A1 | 7/2011 | Walsh et al. |
| 2011/0192857 A1* | 8/2011 | Rothbaum ............ F16M 11/041 220/694 |
| 2011/0199727 A1 | 8/2011 | Probst |
| 2011/0211297 A1 | 9/2011 | Griffin et al. |
| 2011/0218502 A1 | 9/2011 | Iio et al. |
| 2011/0317865 A1 | 12/2011 | Stevinson |
| 2018/0093303 A1 | 4/2018 | Mayfield et al. |
| 2018/0117636 A1 | 5/2018 | Mayfield et al. |
| 2018/0133759 A1 | 5/2018 | Mayfield et al. |
| 2018/0345325 A1 | 12/2018 | Mayfield et al. |
| 2019/0180898 A1* | 6/2019 | Lauder ................. G06F 1/1626 |
| 2019/0321863 A1 | 10/2019 | Mayfield et al. |
| 2019/0321864 A1 | 10/2019 | Mayfield et al. |
| 2020/0094291 A1 | 3/2020 | Mayfield et al. |
| 2020/0114396 A1* | 4/2020 | Mayfield ........... H04M 1/72454 |

FOREIGN PATENT DOCUMENTS

| | | |
|---|---|---|
| EP | 2037661 A1 | 3/2009 |
| FR | 2912858 A1 | 8/2008 |
| JP | 2006074696 A | 3/2006 |
| KR | 200428882 Y1 * | 10/2006 |
| KR | 1020080093178 A | 10/2008 |
| WO | 2010142290 A1 | 12/2010 |

OTHER PUBLICATIONS

Whirlpool Advertisement, "Bye-Bye Front Loaders," p. 2 showing Mate Hug, pp. 1-21.
Apple Online Advertisement, Case-Mate iPhone 3G_3GS Hug Wireless.
Wireless charging mats and receivers for your iPhone, iPod, BlackBerry and other devices | Powermat, 2 pp.
HP Official Store, Palm Touchstone Charging Deck, 1 pp.
Kaiser, Ryan, "Palm Touchstone Kit Review," 6 pp. (Jun. 5, 2009).

(56) References Cited

OTHER PUBLICATIONS

Newton, Harry; "Newton's Telecom Dictionary", 26th Expanded and Updated Edition; 1114 syntax error—systems analysis—3 pp. (2011).
Lackie, John (General Editors); Chambers Dictionary of Science and Technology, p. 1182, 3 pp. (2007).
Hughes, Scott, MIT Dept of Physics, Lecture 10: Magnetic Force; Magnetic Fields; Ampere's Law, pp. 89-97 (Mar. 10, 2005).
Pattison, Matthew et al., "Inclusive design and human factors: designing mobile phones for older users," PsychNology Jnl, vol. 4, No. 3 pp. 267-284 (2006).
Wireless Power Consortium, Inductive Power Transmission (2 pp.) available at: https://web.archive.org/...b/20110821051544/http://www.wirelesspowerconsortium.com/technology/basic-principle-of-inductive-power-transmission.html[Jan. 26, 2021 8:14:51 AM].
Bluetooth Doc, Bluetooth Audio/Video Working Group "Audio/Video Remote Control Profile," 52 pp., avv-feedback@bluetooth.org (May 22, 2003).
Plantronics, Voyager 855, Bluetooth Headset (User Guide) 20 pp. (2007).
Jabra Sport (User Manual) 16 pp. (2011).
Plantronics, Discovery 975 (User Guide) 21 pp. (2009).
Plantronics Discovery 975 Storage Case & Charger 79413-02 Brochure, 1 p.
Advantages and Weaknesses of LED Application | LED inside— LED, LED Lighting, LED Price Trends, Global LED News and Market Research (2 pp.): https://web.archive.org/web/20121102080414/https://www.ledinside.com/knowledge/2007/12/Advantages_and_weaknesses_of_LED_Application_200712[Jan. 27, 2021 (Dec. 2007).
BPF: British Plastics Federation—Plastics in Electrical and Electronic Applications (2 pp.): https://web.archive.org/web/20110811172429/https://www.bpf.co.uk/innovation/plastics_in_electrical_and_electronic_applications.aspx [Jan. 27, 2021].
Mcevoy, Aoife M., Review: "Next-Generation Stereo Bluetooth Headsets | TechHive"; 3 pp. PC World (Apr. 2009).
Motorola Elite Sliver, Bluetooth headset. "Check It Out", (User Guide), 38 pp. (2011).
Adams Magnetic Products | Magnetic Closures for Packaging: https://www.adamsmagnetic.com/blogs/magnet-blog-magnets-packaging-closures[Jan. 27, 2021 11:32:11 AM] (2 pp.).
Macbook Air shells and sleeves Review | Macworld: https://web.archive.org/web/20120403022106/https://www.macworld.com/article/1134919/airshellsleeve.html[Jan. 27, 2021 12:45:22 PM] (3 pp.).
Rohm Semiconductor, "Applications for Hall Effect IC Switches in Portable Electronics," 8 pp. (2009).
ASTM Dictionary of Engineering Science & Technology, p. 1 (3 pp.) (2005).
Plugfones, https://web.archive.org/web/20110820072700/https://www.plugfones.com/[Feb. 3, 2021 8:06:34 AM] (3 pp.).
Beschizza, Rob, "CES: Hands on with the Kleer Wireless Earbuds" | Gadget Lab | Wired, 2 pp. (Jan. 2007).
European Search Report in EP Application No. 12822174.4 dated Feb. 24, 2015.
Ganapati, Priya, Palm's Touchstone: Not Just a Wireless Charger, but a Whole Line of New Line of Products? https://www.wired.com/2009/04/palm-slips-new, Apr. 2013, 4-5 pages.
https://www.youtube.com/watch?v=bTMLQEDetB8; Retro Review: Palm Touchstone Wireless Charger Dock!
Int'l Search Report & Written Opinion in PCT/US2012/049562 (19 pp.), dated Jun. 2, 2013.

\* cited by examiner

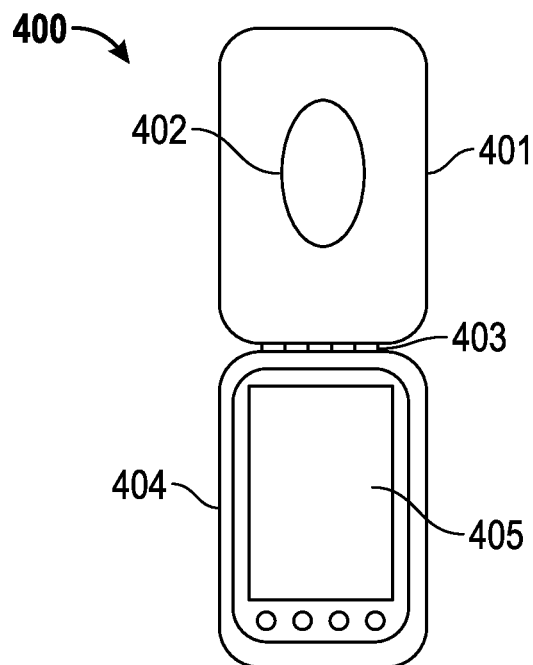
FIG. 4
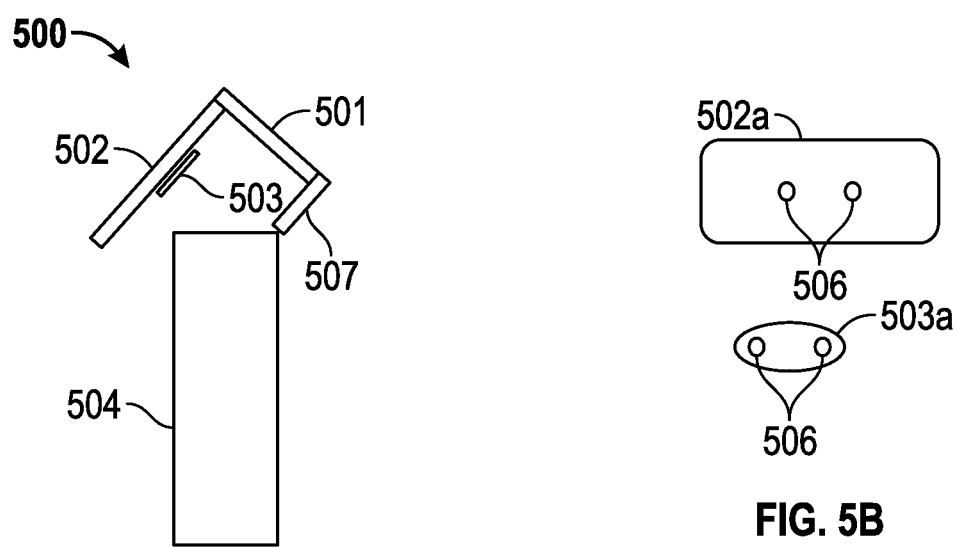
FIG. 5A
FIG. 5B

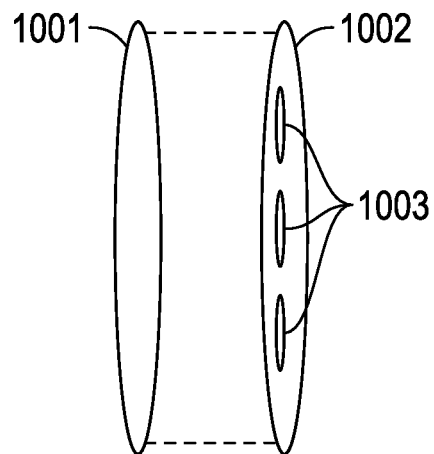 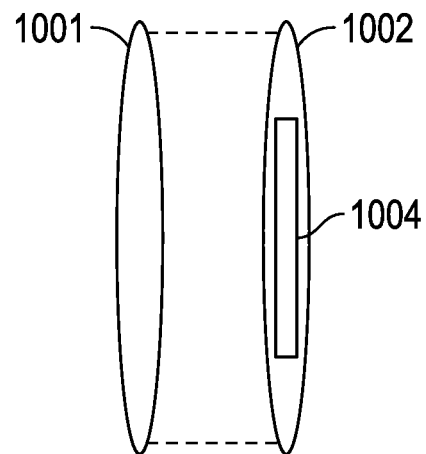
FIG. 10A  FIG. 10B
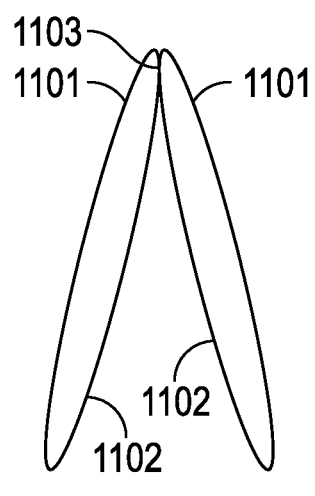 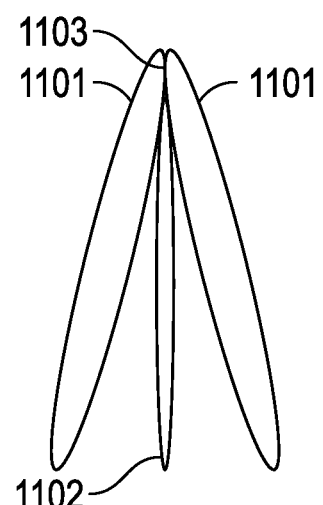
FIG. 11A  FIG. 11B

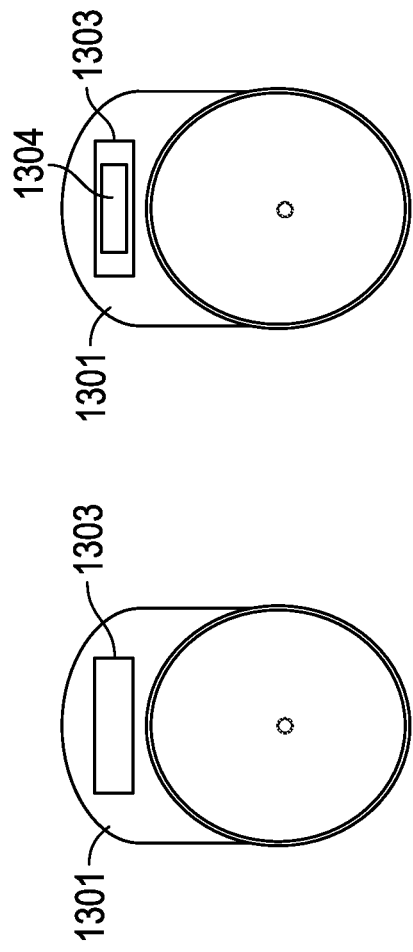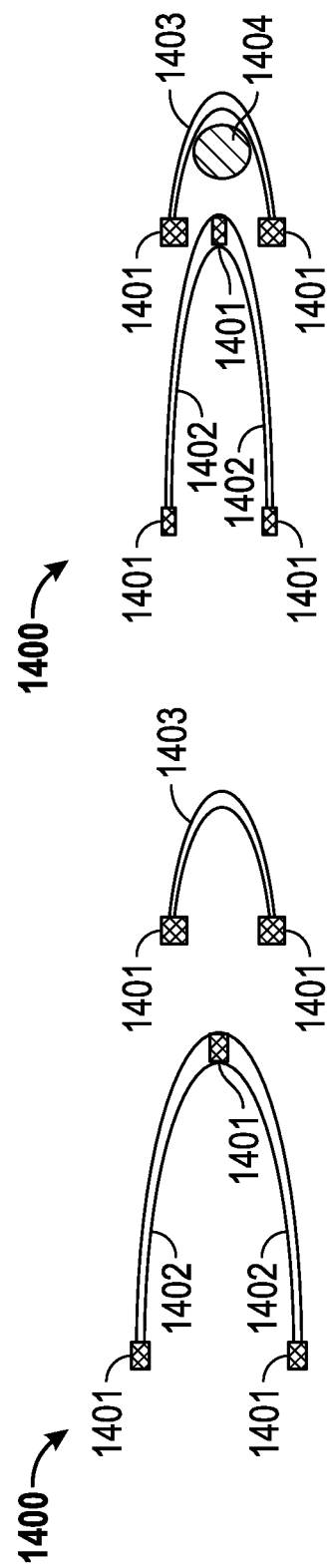

SYSTEM COMPRISING A PORTABLE SWITCHING DEVICE FOR USE WITH A PORTABLE ELECTRONIC DEVICE

CROSS-REFERENCE TO RELATED APPLICATIONS

This application is a continuation of U.S. patent application Ser. No. 16/817,330, filed Mar. 12, 2020, which is a continuation of U.S. patent application Ser. No. 16/704,989, filed Dec. 5, 2019, which is a continuation of U.S. patent application Ser. No. 16/698,223, filed Nov. 27, 2019, which is a continuation of U.S. patent application Ser. No. 16/502,935, filed Jul. 3, 2019, which is a continuation of U.S. patent application Ser. No. 16/460,770, filed Jul. 2, 2019, which is a continuation of U.S. patent application Ser. No. 16/388,691, filed Apr. 18, 2019, which is a continuation of U.S. patent application Ser. No. 16/041,594, filed Jul. 20, 2018, which is a continuation of U.S. patent application Ser. No. 15/851,952, filed Dec. 22, 2017, which is a continuation of U.S. patent application Ser. No. 15/852,000, filed Dec. 22, 2017, which is a continuation of U.S. patent application Ser. No. 15/816,331, filed Nov. 17, 2017, which is a continuation of U.S. patent application Ser. No. 15/597,005, filed May 16, 2017, which is a continuation of U.S. application Ser. No. 14/343,665, filed Jul. 14, 2014, which is a national stage entry of PCT application No.: PCT/US2012/049562, filed, Aug. 3, 2012, which claims priority from U.S. Provisional Application Ser. No. 61/661,090, filed Jun. 18, 2012, and U.S. Provisional Application Ser. No. 61/619,229, filed Apr. 2, 2012; and U.S. Provisional Application Ser. No. 61/592,344, filed Jan. 30, 2012; and U.S. Provisional Application Ser. No. 61/576,834, filed Dec. 16, 2011; and U.S. Provisional Application Ser. No. 61/569,093, filed Dec. 9, 2011; and U.S. Provisional Application Ser. No. 61/568,031, filed Dec. 7, 2011; and U.S. Provisional Application Ser. No. 61/561,087, filed Nov. 17, 2011; and U.S. Provisional Application Ser. No. 61/555,310, filed Nov. 3, 2011; and U.S. Provisional Application Ser. No. 61/515,752, filed Aug. 5, 2011, the entire disclosure of which is incorporated herein by reference in its entirety.

BACKGROUND OF THE INVENTION

1. Field of the Invention

The invention relates to an apparatus for cleaning view screens. The invention particularly relates to such an apparatus used with electrical devices.

2. Background of the Art

Cleaning lenses has long been an issue for the users of devices employing them. For example, telescopes, glasses, binoculars, and cameras have long been used and keeping the lenses of such devices clean has been the subject of many creative efforts.

More recently, there are new devices to clean. With the advent of portable electronic devices, it has become common to observe such devices being used in many public venues. Such venues include coffee shops, restaurants, shopping malls, and the like. These devices can be seen in just about any public setting.

Many of the portable electronic devices have a view screen for displaying text. Some of these devices also are used for displaying photographs and in some cases movies. The newest of these devices display photographs and movies in high definition.

While the view screens are usually rugged, and often covered with a protective film or screen, they are still subject to becoming dirty. Oils from human skin, environmental liquids and powders, and even airborne aerosols and dust can collect on a view screen and make it difficult to use.

Cleaning the view screen of a portable electronic device can be problematic. It is often not desirable to use materials that are readily available to clean the view screen. For example, paper towels and paper napkins or sometimes composed of materials that may scratch and thereby damage a view screen.

Carrying appropriate cleaning materials is sometimes a problem. Cleaning devices are sometimes too bulky to be comfortably carried. In their rush to get ready in the morning, it is easy for users of electronic devices to forget or overlook such preparations for their day.

It would be desirable in the art of manufacturing portable electronic devices to incorporate into such devices the cleaning apparatus. It would also be desirable in the art of providing accessories for portable electronic devices to provide a cleaning component that can be carried on an electronic device case.

SUMMARY OF THE INVENTION

In one aspect, the invention is a method of cleaning a view screen of an electronic device having at least one case comprising wiping the view screen with a cleaning component wherein the cleaning component is configured to selectively couple to the at least one case using a magnetic attractive force.

In another aspect, the invention is a cleaning component for use on an electronic device view screen comprising a cleaning material covering at least one surface of a ferromagnetic or ferrimagnetic substrate wherein the cleaning component has a maximum thickness of 1.5 cm.

In still another aspect, the invention is a small electronic device comprising a case, a view screen, and internal electronic components wherein the view screen and internal electronic components are mounted within the case and the view screen is externally visible in at least one configuration of the case. Also, the case has a surface that is substantially diamagnetic and at least a part of the surface of the case has been configured to receive a cleaning component wherein: the cleaning component is configured to selectively couple to the at least one part of the surface of the case that has been configured to receive the cleaning component; the at least one part of the surface of the case that has been configured to receive the cleaning component is ferromagnetic or ferrimagnetic or overlays a ferromagnetic or ferrimagnetic material; and the cleaning component comprises a cleaning material covering at least one surface of a ferromagnetic or ferrimagnetic substrate.

Another aspect of the invention is a second case, that functions to protect an electronic device's primary case, and has a surface that is substantially diamagnetic and at least a part of the surface of the second case has been configured to receive a cleaning component wherein: the cleaning component is configured to selectively couple to the at least one part of the surface of the second case that has been configured to receive the cleaning component; the at least one part of the surface of the second case that has been configured to receive the cleaning component is ferromagnetic or ferrimagnetic or overlays a ferromagnetic or ferrimagnetic material; and the cleaning component comprises a cleaning material covering at least one surface of a ferromagnetic or ferrimagnetic substrate.

In still another aspect, the invention is a method of cleaning a view screen or a lens for use with a mechanical or non-electronic device having a view screen or a lens comprising wiping the view screen or lens with a cleaning component wherein the cleaning component is configured to selectively couple to the at least one part of the mechanical or non-electrical device using a magnetic attractive force.

In yet another aspect, the invention is a method of cleaning a view screen or a lens using a cleaning component wherein the cleaning component is configured to adhere to portable object different from the object having the view screen or lens.

Another aspect of the invention is employing a cleaning component having a magnet element to activate or deactivate a magnetic switch.

In still another aspect, the invention is a cleaning component having a cleaning surface that is replaceable and held in place within the cleaning component with a tacky adhesive wherein the tacky adhesive is directly on the surface of the non-cleaning surface or the tacky adhesive is in the form of a double sided tape.

In yet another aspect, the invention is a cleaning component having an external cover for protecting one both sides of a cleaning material wherein the external cover is reversible so that it may be folded over to expose the cleaning surface.

In still another aspect, the invention is a case for an electronic device having a magnetic switch, and in the area of the case over the magnetic switch, a recessed area that functions to facilitate a cleaning component having a magnet moving past the switch in order to activate or deactivate the switch.

Another aspect of the invention is a cleaning system having at least one element being a piece of clothing selected from the group consisting of a hat, helmet, sweatband or other headgear; a jacket or coat; a shirt or top; a skirt or pants; and a shoe or boot, wherein the piece of clothing is configured to accept a cleaning component and the cleaning component is held in place, at least in part, using a magnet.

In yet another aspect, the invention may be cleaning system comprising a cleaning component and an area on a device case configured to receive the cleaning component wherein the area of the device case configured to receive the cleaning component and the cleaning component may be used as a game wherein the cleaning component is tossed at the device case configured to receive the cleaning component.

In still another aspect, the invention is a stylus configured to receive a cleaning component.

Another aspect of the invention is a cleaning system having at least one element being an accessory selected from the group consisting of a purse, wallet, computer case, gun case, glasses strap, gloves, backpack, and a belt, wherein the piece of clothing is configured to accept a cleaning component and the cleaning component is held in place, at least in part, using a magnet.

Yet another aspect of the invention is a cleaning component for use on an electronic device view screen comprising a cleaning material covering at least one surface of a ferromagnetic or ferrimagnetic substrate wherein the cleaning component also includes a tab. In one embodiment, the tab is elongated so that it can function as a stand to hold the electronic device upright.

Another aspect of the invention is a cleaning device having a hard surface and cleaning surface and including at least one ferromagnetic or ferrimagnetic material within the cleaning device wherein the at least one ferromagnetic or ferrimagnetic material may function to actuate a power switch or sensor that is capable of being actuated using a magnet.

Another aspect of the invention is a cleaning device having additional functionality such as a remote control, laser pointer or the like.

In one aspect, the invention is a switching device for use with a portable electronic device having a view screen and at least one switch that can be activated or de-activated by introducing a magnetic field to the at least one switch wherein the switching device has at least one magnet and at least one surface that is non-abrasive to the surface of the view screen.

In another aspect, the invention is a switching device for an electronic apparatus that can be activated or deactivated by employing a magnet, the switching device having (i) at least one magnet, (ii) a body surrounding the magnet, and (iii) at least one surface configured to contact any surface of the device, including the view screen; wherein the surface configured to contact the electronic apparatus is non-abrasive to the view screen of the apparatus.

In another aspect, the invention is a method of conserving power when using a portable electronic device having a view screen and at least one switch that can activated or de-activated by introducing a magnetic field to the at least one switch wherein the switching device has at least one magnet and at least one surface that is non-abrasive to the surface of the view screen, wherein the method includes using the switching device to turn the portable electronic device off when the portable electronic device is not in actual use and then on when the portable electronic device is needed.

BRIEF DESCRIPTION OF THE DRAWINGS

The above and other features and advantages of the present invention will become more apparent by describing in detail embodiments thereof with reference to the attached drawings in which:

FIG. 4 illustrates a flip type phone case configured to receive a cleaning component;

FIG. 5A illustrates a lateral type phone case configured to receive a cleaning component;

FIG. 5B illustrates the interaction of two components of the lateral type phone case configured to receive a cleaning component;

FIG. 10A illustrates a cleaning component employing replaceable cleaning surface held in place with a tacky adhesive;

FIG. 10B illustrates the cleaning component of FIG. 10B wherein the tacky adhesive is in the form of a double sided tape;

FIG. 11A illustrates a cleaning component employing a revisable cover;

FIG. 11B illustrates a the cleaning component of FIG. 11A where the cleaning surface is not attached to the cover;

FIG. 13A illustrates a cap having a cleaning component located on the bill of the cap;

FIG. 13B illustrates a bottom view of the bill of the cap having a cleaning component located on the bill of the cap;

FIG. 13C illustrates a bottom view of the bill of the cap having a cleaning component located on the bill of the cap with the cleaning component in place;

FIG. 14A illustrates a cleaning component having a "quick release" capability;

FIG. 14B illustrates a cleaning component having a "quick release" capability with cleaning component in the released state;

FIG. 20 illustrates a cleaning component which may also include a powered devices such as a remote control, laser pointer or the like;

DESCRIPTION OF THE PREFERRED EMBODIMENTS

One embodiment of the invention is a method of cleaning a view screen of an electronic device having at least one case comprising wiping the view screen with a cleaning component wherein: the cleaning component is configured to selectively couple to the at least one case using a magnetic attractive force. For the purposes of this application, the term "at least one case" means the primary case used by a manufacturer to hold and protect the individual electronic components of which an electronic device is composed, but it can also mean a protective case that functions to protect the primary case. For example, a smartphone generally comprises electronics disposed within a rigid shell like case. This would be the primary case. There are available protective cases, often made of leather, rubber, and/or rigid are flexible plastic, that serve to prevent scratches and blemishes on the primary case and sometimes to impart a bit of shock resistance as well.

The term electronic device means such devices having a view screen including, but not limited to cell phones, smartphones, some cameras, some telescopes, some weapons scopes, tablet computers, laptop computers, DVD players, and the like. Other examples include computer monitors, televisions, laboratory apparatus (both portable and non portable), and the like. The method of this application may be used with any electronic device having a view screen.

The term "selectively couple" describes the process wherein a cleaning component of the disclosure is applied to an electronic device and adheres to it because of a magnetic force. In one embodiment of the disclosure, there is sufficient magnetic force to allow the cleaning component to remain in place despite casual movements of the electronic device, but to still be easily removed by a human operator.

Figure 1A:
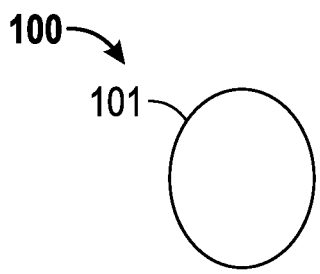
FIG. 1A illustrates the top view of an embodiment of a cleaning component.
Figure 1B:
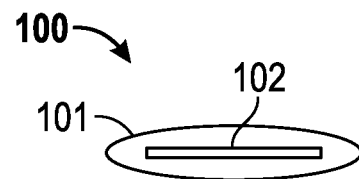
FIG. 1B illustrate the side view of an embodiment of a cleaning component.

Turning to FIGS. 1A and 1B, a top and side view of a round cleaning component (100) are shown. As can be observed, the cleaning component is covered with a cleaner material (101). Cleaner materials useful with the method and apparatus of the application include, but are not limited to fabrics. Exemplary fabrics include microfiber cloths, open-end weave microfiber cloths, double layer cloths wherein the outer layer which would make contact with a view screen is a microfiber cloth, and combinations thereof. For the purposes of this application, the term "fabrics" is defined to further include non-plant materials such as animal skins and/or cloth prepared using synthetic materials or animal materials. In at least one embodiment, the fabric may be a shammy (a.k.a. chamois). In another preferred embodiment, the cleaning material may be the material commonly known in the art as a Micro Shamois Cloth such as is available from iKlear. Any cleaning material that can be used to clean a view screen that does not cause excessive wear or abrasions may be used with the method and apparatus of the application. A ferromagnetic or ferrimagnetic substrate (102) is also shown.

Figure 2A:
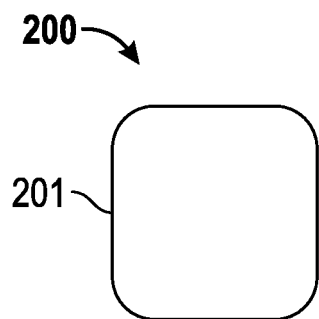
FIG. 2A illustrates the top view of a second embodiment of a cleaning component.
Figure 2B:
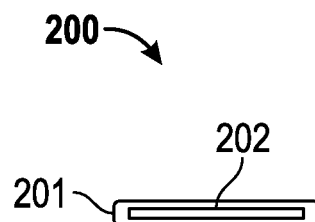
FIG. 2B illustrate the side view of a second embodiment of a cleaning component.

Turning to FIGS. 2A and 2B, a side view of the cleaning component, it can be seen that disposed within the cleaner material (201) is a ferromagnetic or ferrimagnetic substrate (202). The ferromagnetic or ferrimagnetic substrate may be made of iron or other conventional ferrimagnetic and ferrimagnetic materials. In may also be a composite. Exemplary composites include combinations of aluminum, nickel, and cobalt compound with iron. Such composites may be made by sintering metals or by mixing the metallic components with a resin and injection molding. Mixtures of iron oxide and ceramic components such as barium and strontium carbonate may be used to make ceramic magnets for use as the Ferromagnetic or ferrimagnetic substrates useful with the application. For the purposes of this application, rare earth magnets, such as but not limited to samarian and neodymium based magnets, are ferrimagnetic and ferrimagnetic materials and may be used to prepare the Ferromagnetic or ferrimagnetic substrates useful with the application. Any magnetic material or material that is attracted to magnets may be used to prepare the Ferromagnetic or ferrimagnetic substrates useful with the application.

In another embodiment, the invention is a cleaning component for use on an electronic device view screen comprising a cleaning material covering at least one surface of a ferromagnetic or ferrimagnetic substrate wherein the cleaning component has a maximum thickness of 1.5 cm. Turning to FIGS. 2A and 2B, a top and side view of a rectangular cleaning component is shown. In this embodiment, a cleaner material (201) is shown surrounding, on both sides, a ferromagnetic or ferrimagnetic substrate (202) that is rectangular in shape.

Figure 2C:
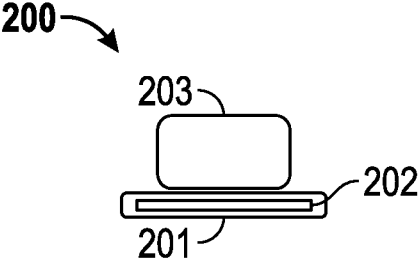
FIG. 2C illustrates an embodiment similar to that of FIG. 2B, but having a tab.

In some embodiments, the cleaning material is present only on one side of the substrate. On the other side of the substrate is a different material that is selected to facilitate movement of the cleaning component on a view screen or to protect from a hostile environment. This material may be textured or it may be one that has a higher coefficient of friction than the cleaning material. In a variation of this embodiment, the cleaning component may include a tab that can be pinched to facilitate moving the cleaning component. In still another variation, in this latter embodiment, the tab may be constructed such that it can lay down in order to lower the profile of the cleaning component. Turning to FIG. 2C, a cleaning component otherwise identical to that of FIGS. 2A and 2B is shown, except that a tab (203) is shown in the raised position.

The dimensions of the cleaning component may vary according to its intended use. For example, one class of small electronic devices upon which the cleaning components may be employed is cell phones. The cell phone class includes both cell phones and devices combining cell phone functionality with computing power such as the so called smart phones. When the cleaning component will be used with a cell phone, it may have dimensions ranging as follows. Length may range from about 2.1 cm to about 0.5 cm. In one embodiment, the length may be about 1.7 cm. Width may range from 1.9 cm to about 0.5 cm. In one embodiment, the width may be about 1.7 cm.

Another class of small electronic devices is the so-called tablet computers. When the cleaning component will be used with a tablet computer, it may have dimensions ranging as follows. Length may range from about 7.5 cm to about 0.6 cm. In one embodiment, the length may be about 2.5 cm. Width may range from 3 cm to about 0.5 cm. In one embodiment, the width may be about 2.5 cm.

In embodiments of the disclosure wherein the cleaning component will be employed on a cell phone or tablet computer, it may be desirable to make the cleaning component as thin as possible. This is of course the subject the caveat that the cleaning component is thick enough to be easily manipulated during the cleaning process. While in some embodiments the cleaning component may be as thin as a sheet of paper, but in most embodiments it will have a thickness of from about 0.5 cm to about 1 mm.

The overall shape of the cleaning component when used with cell phones and tablet computers may be round, oval, rectangular, or square. In some embodiments, in order to avoid overlapping with a view screen, the cleaning component may be shaped to fit available space.

The cleaning components of the disclosure may be used with another class of small electronic devices, commonly referred to as laptop computers. They may also be used with televisions, laboratory instruments, and the like. Because these devices are larger it may be desirable in some embodiments to increase the dimensions of the cleaning component. For example, the length of cleaning component used with these devices may range from about 10 cm to about 1 cm. The optimum length may range from about five cm to about 8 cm. The width may range from about 0.5 cm to about 5 cm. The optimum width may be from about 0.5 to about 5 cm. Similar to the other classes, the cleaning component may be as thin as a sheet of paper, but in most embodiments it will have a thickness of from about 0.5 cm to about 1 mm.

For the larger devices, shape is generally not as critical. There are often larger areas to which the cleaning component can be coupled. For these applications, it is often desirable to make the cleaning component rectangular in shape. Still, other shapes would be within the scope of the claims of this application.

Another embodiment of the application invention is a small electronic device comprising a case, a view screen, and internal electronic components wherein the view screen and internal electronic components are mounted within the case. In this embodiment, the view screen is externally visible in at least one configuration of the case and the case has a surface that is substantially diamagnetic. At least a part of the surface of the case has been configured to receive a cleaning component. Further, the cleaning component is configured to selectively couple to the at least one part of the surface of the case that has been configured to receive the cleaning component; the at least one part of the surface of the case that has been configured to receive the cleaning component is ferromagnetic or ferrimagnetic or overlays a ferromagnetic or ferrimagnetic material; and the cleaning component comprises a cleaning material covering at least one surface of a ferromagnetic or ferrimagnetic substrate.

It may be desirable, in some applications, to make the cleaning components such that they have beveled edges. Such components could be particularly useful when coupled with devices having a case configured to accept the cleaning component wherein there is a ridge configured to accept the beveled edge to more securely hold it in place.

Some electronic devices have view screens that are always visible. Exemplary of this are some cell phones and tablet computers that do not have covers. Other devices such as laptops have view screens that may be seen only when the cover is lifted.

In embodiments of the disclosure where a case has been configured to receive a cleaning component, it may be so configured in several ways. In one embodiment, such a case is configured by placing a ferromagnetic or ferrimagnetic material onto the surface of the case where the cleaning component is received. In another embodiment, the case is prepared such that the case itself is composed of a ferromagnetic or ferrimagnetic material at the point where the cleaning component is received. In still another embodiment, the case is prepared by placing a ferromagnetic or ferrimagnetic material underneath where the cleaning component is received. Additionally, the case may be fabricated such that the cleaning component is received into a groove, slot, or other indented geometrical shape to lower the profile of the cleaning component to facilitate closing a cover or prevent snagging a cleaning component. Another reason to lower the profile that the cleaning component may be to enhance the aesthetics of the device.

Figure 3:
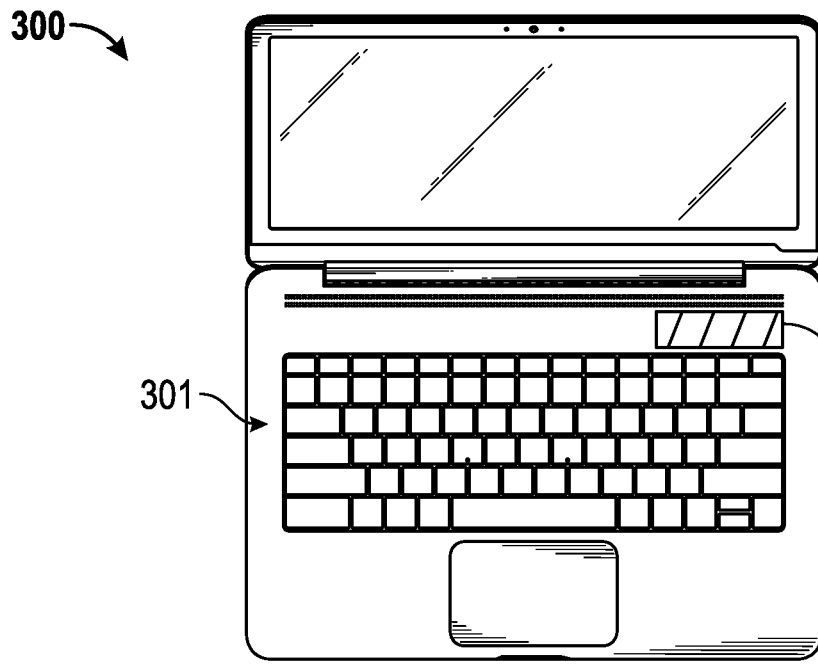
FIG. 3 illustrates a computer case configured to receive a cleaning component.

Turning to FIG. 3, the base of a laptop computer (300) is shown. Above and to the right of the keyboard (301) is a rectangular indention (302) having dimensions and all three directions that are slightly larger than those of a cleaning component (303). In one embodiment of the disclosure, the cleaning component has a ferromagnetic or ferrimagnetic substrate that is a permanent magnet. The case, at the base of the invention, is prepared using a ferromagnetic material.

In employing the method of the disclosure, the cleaning component is coupled to the base of the laptop computer by placing it within the invention. The magnetic attractive force between the permanent magnet and the ferromagnetic material holds the cleaning component in place as a laptop computer is moved. The cleaning component is decoupled from the laptop computer base by lifting it to overcome the magnetic force. The cleaning component is then placed on the view screen (not shown) and is then moved across the view screen using one or more fingers. After the view screen has been cleaned, the cleaning component may be recoupled to the computer base.

Similarly, the method and apparatus of this disclosure may apply to a second case. In this embodiment, a case constructed to protect the primary case of a small electronic device may be similarly configured to receive a cleaning component. Such cases which are sometime manufactured by 3$^{rd}$ party providers generally serve to protect the finish of the primary case and/or provide additional impact protection for the electrical components of the small electronic devices.

In practicing the method of the disclosure, there are three basic embodiments regarding the source of magnetic force used. In one embodiment, the cleaning component may include a magnet and the case may include an unmagnetized ferromagnetic or ferrimagnetic material. In a second embodiment, the cleaning device may have only an unmagnetized ferromagnetic or ferrimagnetic material and the magnet may be in or on the case. In the third embodiment, both the cleaning component and the case may include a magnet.

When a magnet or a ferromagnetic or ferrimagnetic material is applied to a case, in one embodiment, it may be adhered using a tacky adhesive. One such embodiment includes using double sided gaffer's tape as the source of the tacky adhesive. Any tacky adhesive can be used with the method of the application.

In one embodiment, the cleaning component of the application may be used as a source of advertising. For example, in one embodiment of the application, a cleaning component may have imprinted upon it a logo, trademark, slogan, or the like. In another embodiment, a pre-printed substrate having a logo or decorative side, and optionally, a second adhesive side may be used. In some of these embodiments where the substrate includes an adhesive, it may be used to secure a magnet to the cleaning component. In another embodiment, the substrate having an adhesive may be free of advertisements and/or decoration.

In this application, the term diamagnetic is used to delineate materials that are not ferromagnetic or ferrimagnetic. From a practical perspective, the materials that are paramagnetic have such a weak attraction to magnets that they would not be effective if utilized and thus are to be treated as if they are diamagnetic.

While, generally speaking, the cleaning components are meant to be unitary, in some embodiments, the cleaning material may be removed and replaced with new cleaning material. Also, the cleaning components may be configured such that they have a thinner center to allow a user to employ lateral force to the cleaning component to more easily slide it across the surface of a view screen. In some embodiments, the cleaning component may have a profile such that the cleaning component is thinner in the middle and near the edge of the cleaning component.

Other embodiments of the invention include those such as are illustrated in FIG. 4. In this embodiment, a flip case and a smart phone 400 is shown. The flip case includes a cover 401, a hinge 403, and a base 404 holding the smartphone 405. The cleaning device 402 is held in place by means of a magnet (not shown). In one embodiment, the magnet is built into the cover. In another embodiment, the magnet is attached to the cover using an adhesive. In still another embodiment, the cover includes a ferromagnetic or ferrimagnetic material rather than a magnet.

While many of the cleaning components have a single magnet or ferromagnetic or ferrimagnetic substrate, this is not a limitation of the application. In some embodiments, it may be desirable to have multiple magnets in a cleaning component. For Example, at FIG. 5, a case having two magnets to hold it closed 500 is shown. This case consists of a body 504 which functions to hold a smartphone; and a lid having a top 501, a side 502, and a hinge 507. Also shown is the cleaning component 503 adhering to the inside of the side of the lid. The side is shown again at 502a from lateral perspective with the magnets visible 506. The cleaning component 503a is also shown from a lateral perspective, again showing two magnets 506. The two magnets of the case line up with the two magnets of the cleaning component in some embodiments to allow for a more secure fit to the case.

Figure 6:
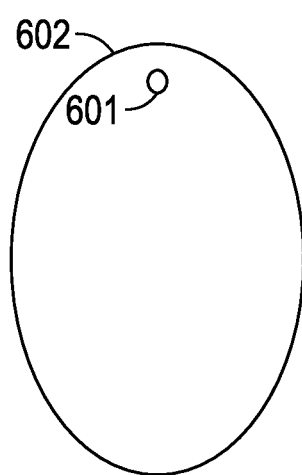
FIG. 6 illustrates a cleaning component with a single offset magnet.

Note that in the embodiments shown in FIG. 5, the magnets are offset from center. The magnets may be placed anywhere within the cleaning component as necessary to facilitate their use with a device. For example, in FIG. 6, a cleaning component 602 is shown with a magnet 601 offset near the edge of the component. In one example of a method of the application, the cleaning component is adhered to the top of a device having a case that closes, such as a laptop computer, with the body of the cleaning component rotated down when the case is closed. When the laptop is opened for use, the body can be rotated up and away from the screen.

Figure 7:
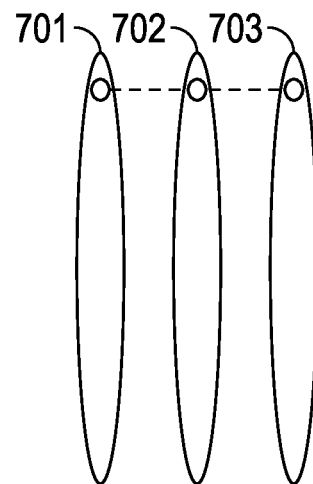
FIG. 7 illustrates a cleaning component having multiple layers.

In some embodiments, the cleaning component of the application can be composed of multiple layers. For example, in one such embodiment illustrated in FIG. 7, a three layer cleaning component may be seen. Therein, a cleaning component having an offset magnet 702 and as described hereinabove is shown. It is sandwiched between two additional layers (701 & 703) that serve to protect the cleaning layer from ambient conditions that might shorten its useful life. One such environment could be one that is dusty such as in a production facility that employs saws or knives to cut dust generating objects. In an alternative embodiment, there may be multiple cleaning components so that dirty or worn components can be discarded.

In an alternative embodiment, the layers of the cleaning component may be stitched or otherwise joined with the caveat that at least one external layer will have a magnet or a ferromagnetic or ferrimagnetic substrate.

The cleaning components of the application may be used with mechanical and/or non-electrical devices having small view screens, windows, or lens. For example, in one embodiment, a cleaning component may be used with a site glass in a chemical manufacturing facility. In another embodiment, the cleaning component may be used with a pump to facilitate the cleaning a window used to make visual inspections of the material within the feed or flow lines. The cleaning components are particularly useful with devices having lens.

Figure 8:
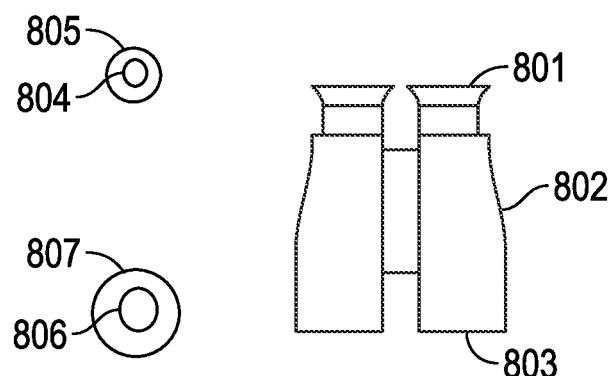
FIG. 8 illustrates a cleaning component used with a set of binoculars.

Devices that have lens include, but are not limited to telescopes, binoculars, eye glasses, and weapon scopes. Turning to FIG. 8, a pair of binoculars is shown having eye pieces 801, a body 803, and objective lens 804. In one embodiment, a cleaning component for the lenses may be secured in place using a magnet directly upon the body of the binoculars. However, in a preferred embodiment, the cleaning component (804 or 806) is secured to the inside of a lens cap or an eyepiece cap (805 or 807). In such an embodiment, different sized cleaning components may be employed and by placing them under the lens cap, they are protected from the environment except when in use, thereby extending their use-life.

In one preferred embodiment, a lens cap may be prepared or even retrofitted to work with the cleaning components of the disclosure by deploying a magnet on the outside of the lens cap using an adhesive. In an especially useful embodiment, the magnet serves as the base for a tether that terminates in an element useful for attaching the lens cap to another object, such as the device to which it is employed to protect a lens.

In an alternative embodiment, the cleaning component may be configured to adhere to a case for the objects having lens.

While the adhesive may be a tacky adhesive such as already discussed hereinabove, it may also be a permanent adhesive. Such permanent adhesives may be selected from acrylic emulsion adhesives, rubber-based adhesives, or any other suitable material exhibiting durable bonding qualities.

In a related embodiment, a cleaning component of the invention may be secured to a portable object, such as, but not limited to, a set of keys, jacket, other clothing items, jewelry, belts, or other items worn or kept in a pocket, by employing a tether having a first end terminating in form suitable for connecting to, for example the key chain and a second end terminating in a magnet configured to secure a cleaning component as describe hereinabove. Two uses for this embodiment would be the cleaning of glasses and also the cleaning of goggles or other protective eyewear.

In an alternative embodiment, the magnet that was on the tether can attached a clip or other device suitable for affixing the cleaning component to the portable object.

In yet another alternative embodiment, the portable object may be modified to include a magnet so that the cleaning component can be secured directly to the portable object.

In still another related embodiment, a cleaning component of the application can be adhered to a personal accessory such as a wallet, change purse, purse or the like.

Figure 9:
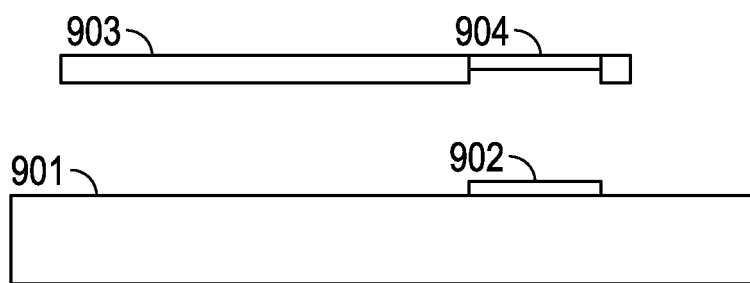
FIG. 9 illustrates a cleaning component employing a structural feature to enhance adhesion.

The cleaning components may be configured with sufficient structural integrality that they have constant or at least resilient shape at the magnet so that they may employed with devices having cases configured to utilize that dimensional stability to increase the security with which the cleaning components are adhered to the case. FIG. 9 shows such a device case 901 having a raised section 902 configured to fit within a recess 904 of a cleaning component 903. The magnets (not shown) are within the recessed and raised parts of the case and cleaning component. When joined, the fitting of the raised section and recessed sections add an additional level of security to the magnetic adhesion.

Another embodiment of the disclosure includes incorporating a magnet or ferromagnetic or ferrimagnetic material into a rigid or semi rigid construction configured to accept a cleaning material as defined hereinabove. In some applications of this embodiment the rigid or semi-rigid construction can be used to facilitate moving the cleaning material during the process of cleaning.

In addition to their cleaning functionality, the cleaning components of the application have a functionality of being able to active magnetic switches on devices having such switches. This is particularly useful in saving battery life as it does not require the cover of such devices to be closed (the normal mode for activation of such switches). In the use of tablet devices having a magnetic switch, the cleaning components are particularly useful as the tablet can be put into hibernation mode with a single touch to the cleaning component as compared to the multiple touches required to do the same thing using the touch pad of the tablet.

In one embodiment where a cleaning component of the application is employed on a tablet using the Apple® Smart Cover, it may be employed on the outside of the smart cover to function as a handle for more easily manipulating the cover. Magnets at the bottom of the Smart Cover allow for a very efficient employment of the cleaning component.

Another embodiment of the cleaning components of the application is one where the cleaning component has a cleaning surface that is replaceable and held in place within the cleaning component with a tacky adhesive wherein the tacky adhesive is directly on the surface of the non-cleaning surface or the tacky adhesive is in the form of a double sided tape. Turning to FIG. 10A, there is an illustration of an enhancement to any of the other cleaning components discussed herein, wherein a cleaning surface 1001 is held in place on a non-cleaning surface 1002 using a tacky adhesive 1003. In FIG. 10B, an alternative embodiment is shown wherein the tacky adhesive is in the form of a double sided tape 1004.

In still another embodiment, the cleaning component is one having an external cover for protecting one or both sides of a cleaning material wherein the external cover is reversible so that it may be folded over to expose the cleaning surface. Turning to FIG. 11A, a configuration where single side of two cleaning surfaces 1102 is protected by an external cover 1101. The external cover 1101 includes a hinge 1103 which may be a cloth hinge or a mechanical hinge or any other type of hinge known to those of ordinary skill in the art which would not interfere with the cleaning functionality of the cleaning component. In one embodiment, the configuration of FIG. 11A when not reversed is particularly useful for cleaning both sides of a lens such as in a pair of eyeglasses. In some embodiments, the cleaning surfaces may be specialized with one side of the cleaning surface being more useful removing oily materials while the other side is more useful for removing water based materials from a lens or view screen surface.

The cleaning component may be, in some embodiments, stored in an eyeglasses case configured to receive the cleaning component. In some embodiments, this case may include a magnet and in other embodiments, the case may be prepared using a ferromagnetic or ferrimagnetic substrate.

Turning to FIG. 11B, in this embodiment the same a single sheet of cleaning material 1102 is shown where the cleaning material hangs from the hinge area of the cleaning component 1103. In either of these embodiments, the external component may be fully opened and folded back upon itself to serve as a support of the cleaning surface.

Figure 11C:
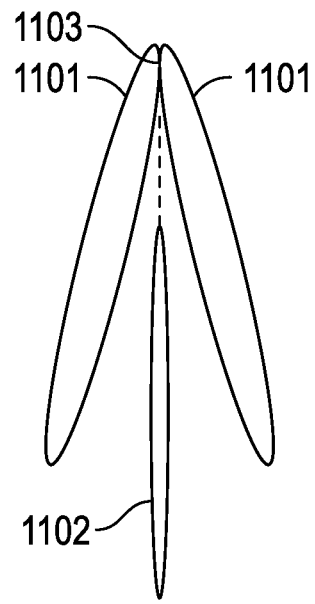
FIG. 11C illustrates a the cleaning component of FIG. 11A where the cleaning surface is detachable.

Turning to FIG. 11C, still another useful configuration is shown where the cleaning material, 1102 is shown to be detachable. In some embodiments, the cleaning material is held in place with a magnet or ferromagnetic or ferrimagnetic substrate. If there is a magnet in both the cleaning material and the cover, in some embodiments, at least one of the magnets will be on a swivel to facilitate the easy replacement of the cleaning material within the cover.

Figure 12:
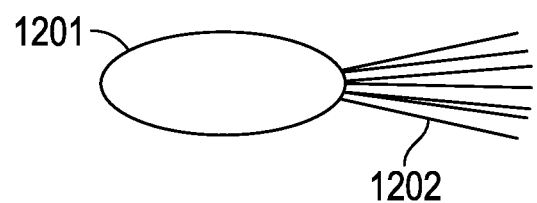
FIG. 12 illustrates a cleaning component including a brush.

In another embodiment, the cleaning component is a configured to work with optical devices such as scopes and binoculars wherein the cleaning component includes at least one cleaning surface and brush. Such a cleaning component is illustrated in FIG. 12. The body of the cleaning component 1201 has at least one surface that is a cleaning surface and in some embodiments, the entire body is a cleaning surface. The body also acts as a support for a brush 1202. The bristles of the brush may be employed to remove sand, dust or other materials from a lens or view screen. After this removal, the cleaning surfaces may be used to further clean the lens or view screen. In one particularly desirable embodiment, the cleaning component is sized to fit within a lens cap and may be held in place in the lens cap employing an magnet (not shown), In still another embodiment, the cleaning component has a cleaning only one side and the other side a tab or other construction to facilitate holding the component. And, yet another embodiment, there is no cleaning surface and this configuration functions only as a brush.

In another embodiment, a cleaning system having at least one element being a piece of clothing may be selected from the group consisting of a hat, helmet, sweatband or other headgear; a jacket or coat; a shirt or top; a skirt or pants; and a shoe or boot, wherein the piece of clothing is configured to accept a cleaning component and the cleaning component is held in place, at least in part, using a magnet. The magnet may be incorporated using any method known to those of ordinary skill in the art of preparing clothing. Turning to FIG. 13A, a cap 1300 having a bill 1301 is shown. In this embodiment, at FIG. 13B, a magnet 1303 is located on or in the bill of the hat. FIG. 13C illustrates a cleaning component 1304 in place on the bill.

The cleaning components of the application may be placed in any type of clothing. For example, the cleaning devices may be employed with a boot having an magnet located on the upper quadrant of the boot. In another example, the magnet may be incorporated into a pocket of a pair of trousers analogous to a watch pocket within a pocket of times past. Any employment of a magnet to secure the cleaning devices of the application within a piece of clothing is within the scope of the invention.

Turning to FIG. 14, an embodiment of the disclosure is illustrated that is a quick release cleaning component. In this embodiment, at FIG. 14A, a cleaning component which includes a flexible cover 1400 and a cleaning material 1402 within the flexible cover bends or folds such that two magnets 1401 at the ends may function to keep it folded when not in use. A third magnet in the middle of the cleaning component serves to secure it to the body of a holding component having index number 1403. The holding component is composed of the same flexible cover material, at least in some embodiments, and usually will not include a cleaning material. The holding component will also have magnets 1401 at the ends. FIG. 14B shows this cleaning component engaged upon a substrate 1404, often a key ring, a caribbeaner, or a ring on a jacket or other article of clothing.

When engaged with the cleaning component, the holding component wraps around the substrate and the magnets at the end of the holding component hold the cleaning component in place employing the magnet at the middle of the cleaning component. The cleaning component can be quickly removed by pulling it with a force sufficient to overcome the attraction of the magnets. As the cleaning component leaves the holding component, the magnets of the holding component will be attracted to each other thereby keeping the holding component wrapped around the substrate.

Figure 15:
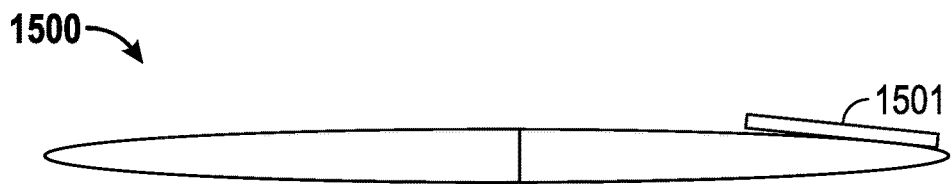
FIG. 15 illustrates a stylus for use with a cleaning component.

Turning to FIG. 15, a stylus 1500 is shown that is configured to accept a cleaning component of the disclosure (not shown). In this figure, the stylus may be prepared wherein the entire stylus exterior is a magnet or a substrate that would be attracted to a magnet. In an alternative embodiment, the stylus includes a clip 1501 or other decorative component which can serve as a substrate to accept and hold a cleaning component. Note that the stylus may also be a writing implement.

Figure 16A:
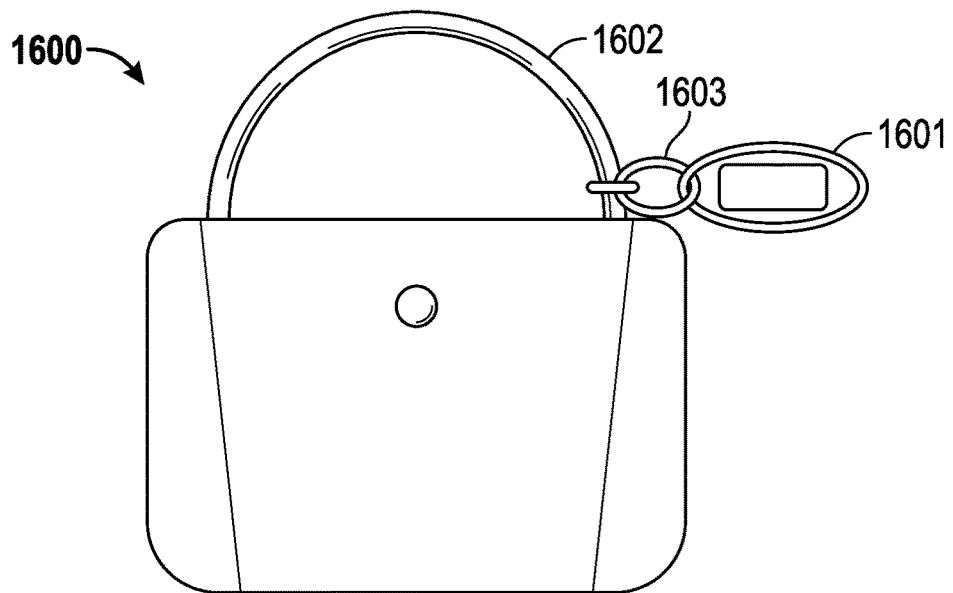
FIG. 16A illustrates a purse having a cleaning component attached thereto.

Another aspect of the invention is a cleaning system having at least one element being an accessory. The accessory may be selected from the group consisting of a purse, wallet, computer case, gun case, glasses strap, gloves, backpack, and a belt, wherein the accessory is configured to accept a cleaning component and the cleaning component is held in place, at least in part, using a magnet. In FIG. 16A, a purse 1600 is shown having attached thereto a cleaning component 1601 of the application. The cleaning component is shown attached to the handle 1602 of the purse. The cleaning component is shown in this illustration as being attached via a simple loop 1603 from the handle, but it can be attach using any means known to those of ordinary skill in the art or otherwise already disclosed herein. For example, the cleaning component may be attached to the pull tab of a zipper. It may also be attached to a decorative ring. On a backpack, it may be attached to a ring which also allows for the attachment of a shoulder strap.

Also shown in FIG. 16A is the use of a logo for advertising purposes wherein the logo is clearly visible on the cleaning component.

Figure 16B:
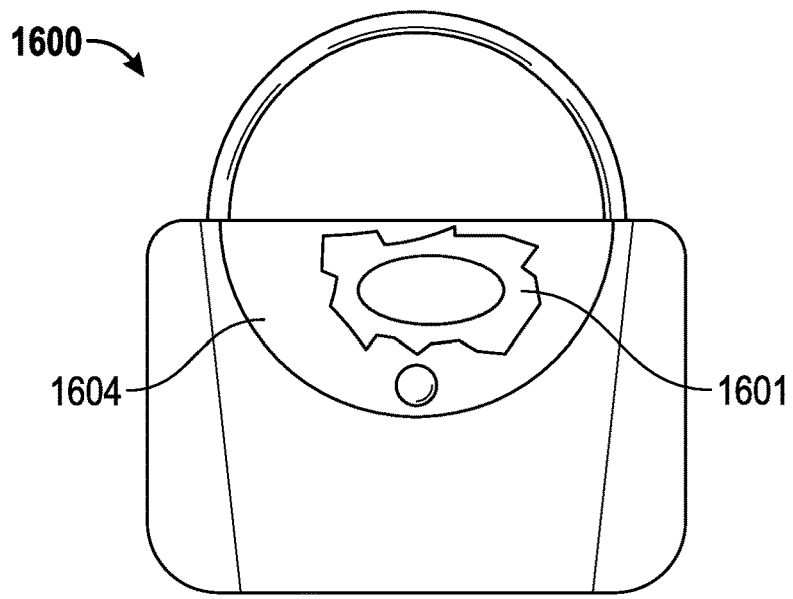
FIG. 16B illustrates an alternative embodiment of the purse having a cleaning component attached thereto.

In FIG. 16B, an alternative embodiment of the purse is shown wherein the cleaning component is attached to a purse having a flap 1604. In this embodiment, the cleaning component, shown in a cut-away view, is protected from environmental damage by being between the flap and the side of the purse. In one embodiment, the purse includes a magnet that then couples with the magnet of the cleaning component to hold it in place.

Figure 17A:
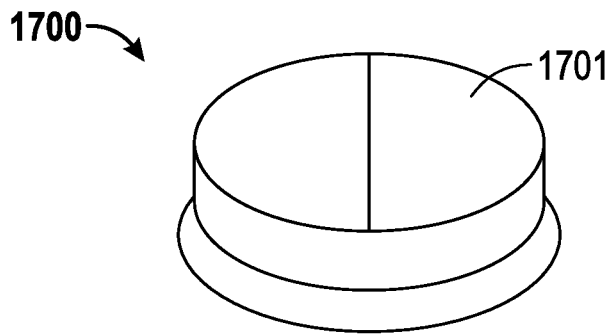
FIG. 17A illustrates a top view of a cleaning component having a tab and a magnetic tab hold-down.
Figure 17B:
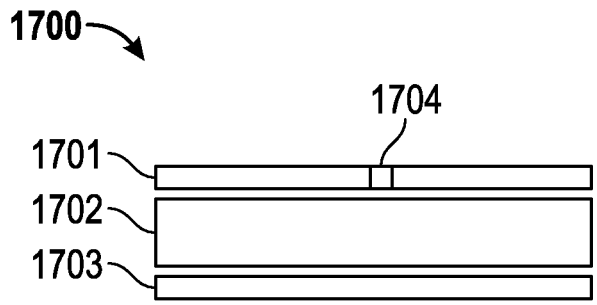
FIG. 17B illustrates a side view of a cleaning component having a tab and a magnetic tab hold-down.
Figure 17C:
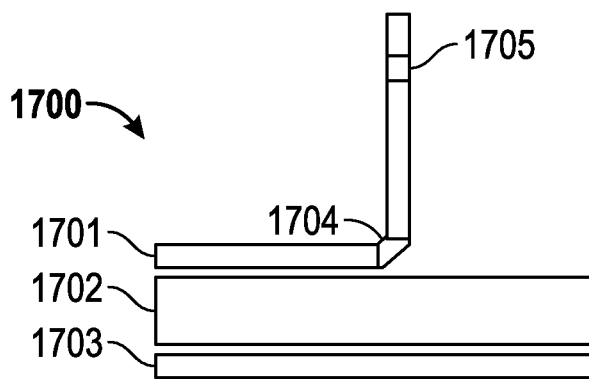
FIG. 17C illustrates a side view of a cleaning component having a tab and a magnetic tab hold-down with the tab in the raised position.

The cleaning components may be enhanced by adding additional features. For example, the cleaning component having a tab illustrated in FIG. 2C may be further enhanced by employing a magnetic hold-down. Turning to FIG. 17A, a cleaning component 1700 having a tab 1701 is shown with the tab in the closed position. FIG. 17B is a side view of the same cleaning component. Also shown in this view are the magnet 1702 and cleaning material 1703. It can be seen in this view that the tab has a hinge 1704 at its center. In FIG. 17C, the cleaning component is shown with the tab in the raised position and also showing a magnet 1705 within the raised portion of the tab. The magnet, when the tab is closed, functions to hold the tab down which may prevent the tab from being broken or the tab being caught by another object resulting in the cleaning component being unintentionally removed from its substrate.

Figure 18:
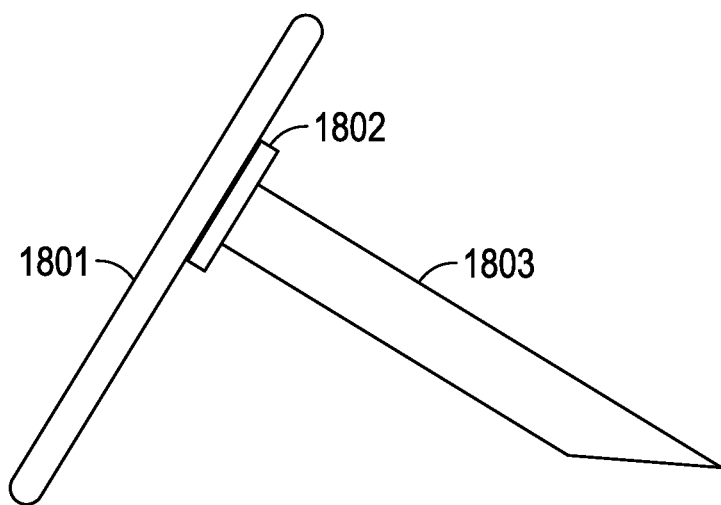
FIG. 18 illustrates a side view of a cleaning component having a tab wherein the tab is elongated and functions as a stand for an electronic device.

In another embodiment featuring a tab, FIG. 18 illustrates an electronic device 1801 having a cleaning component 1802 with an elongated tab 1803. The tab is hinged (not shown) so that it may be positioned to act as a stand. FIG. 18 illustrates a "portrait" configuration, but in another embodiment, the stand may be used to hold the device in a "landscape" configuration.

Any cleaning component useful with the application may be prepared using additives that may be applied to the cleaning material to make it more suitable to a specific cleaning job. For example, in some embodiments, the cleaning material may be treated to make it better at removing oily smudges from a lens while in other embodiments, the cleaning material may be modified to make it better for removing hydrophilic dirt or smudges. In still other embodiments, the cleaning material(s) in a cleaning component maybe selected to have part of the component be useful for oily smudges while another part of the cleaning component is more useful for hydrophilic dirt or smudges. In embodiments where the cleaning components have more than one cleaning surface, then the cleaning materials and/or additives may be selected so that they are useful for cleaning both types of smudges/dirt.

In some embodiments of the cleaning components of the application, the use of magnets or ferromagnetic or ferrimagnetic substrates is done with magnetic orientation utilized to facilitate the removal or replacement of the cleaning component to/or a case or other substrate. For example, when possible it is desirable to employ only a single magnet at a contact/adhesion point where the magnet is affixed using a ferromagnetic or ferrimagnetic substrate. This avoids entirely the problem of magnetic orientation when returning the cleaning component.

When the strength of two magnets is necessary, then the use of a swivel as described above may be desirable. Other means of mitigating the issues arising with magnetic orientation include but are not limited to printing a notice on the device (such as "this side up" or configuring the shape of the cleaning component such that it is obvious which side of the cleaning component will have an attraction to the magnet fixed on or within the case to which it is being applied.

Any cleaning device of the application may be prepared using an additional layer that functions to stiffen the cleaning device. As the objects to be cleaned, be they viewscreens or lens, get larger, it may be desirable to stiffen the cleaning device. Materials useful as a stiffening layer include, but are not limited to plastic, metal, wood and heavy fabrics.

The cleaning components of the disclosure, when prepared with especially strong magnets, can have a dual purpose of being a game component. For example, in an embodiment where a smart phone is within a case having a recessed area configured to receive a cleaning component, the recessed area and the cleaning component may be shaped to resemble a ball or other game object. If the cleaning component is tossed accurately, it will be attached into the recessed area and such a toss could be a goal or score. Any such game is within the scope of the invention.

In order to make the cleaning components more desirable to young users, they may be converted into or incorporated into dolls or toys with the caveat that the doll or toy is configured to be attached to or perched upon an electronic device and secured thereon using a magnet. While trademarked and/or copyrighted toys and dolls may be used (subject to proper licensing), even generic toys and dolls may be used, particularly if they will function to encourage proper maintenance of devices by, at least in some instances, young users. For example a Mini Beanie Baby™ from TY™ may be configured to sit upon a rectangular cleaning component wherein the cleaning component resembles a "rug." In another embodiment, covers and cases for electronic devices may be configured to resemble a cage or a house and an appropriately selected figure prepared using a cleaning material on at least one surface and at least one magnet. The figure/cleaning component could be adhered to the cover or case such that it appears to be using the cage/house. One example would be the use of a Snoopy™ shaped cleaning component on a case or cover having a doghouse design or shape. In another embodiment, an Angry Bird™ figure could be configured to sit upon (aka perch) upon the top of a case or cover being secured from falling by the magnet containing within the cleaning component.

In yet another example of employing the cleaning components of the application, a cleaning component may be used on the contact surface of interactive toys used with electronic devices. The advantage of this embodiment would be that the toy would simultaneously clean a view screen/monitor while providing entertainment. In still another embodiment, such devices may be employed for purposes of therapy rather than entertainment, or they may be used for both.

Figure 19A:
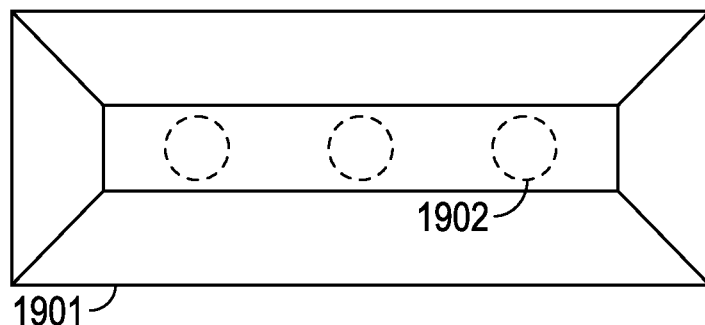
FIG. 19A illustrates a top view of a cleaning component which may also be a switch for electronic devices having a magnetically activated switch or sensor.
Figure 19B:
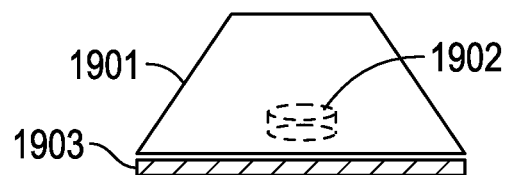
FIG. 19B illustrates a side view of a cleaning component which may also be a switch for electronic devices having a magnetically activated switch or sensor.

The cleaners of the application, in some embodiments, may be prepared from wood, plastic or even metal. Turning to FIGS. 19A&B, a combination switch and cleaner for an electronic device is shown. The switch/cleaner may be made with, for example, acrylic plastic. In this embodiment, the switch is shown from above in FIG. 19A where the hard shell is 1901 and three magnets are enclosed within the shell and have the reference number 1902. FIG. 19B is a side view that also shows the cleaning material, 1903.

Cleaners such as those illustrated in FIG. 19 may be employed with devices that have power switches or sensors that may be actuated using a magnet. In some embodiments, the magnets of these cleaners may serve a dual function of both actuating a sensor or switch and holding the cleaner in place when not in use. As devices change, the number and location of the magnets could be modified to fit new devices.

In addition to the shape shown in the drawing, the cleaner/switches may be further modified to facilitate use by incorporating recesses (not shown). In an alternative embodiment, the switch may also have a knob, or "bumps" or surface features that allow for an easier "grip" by the finger, two fingers, one or two fingers and thumb used to move the cleaner/switch. In some embodiments, a tacky adhesive may even be employed upon the surface.

Figure 20:
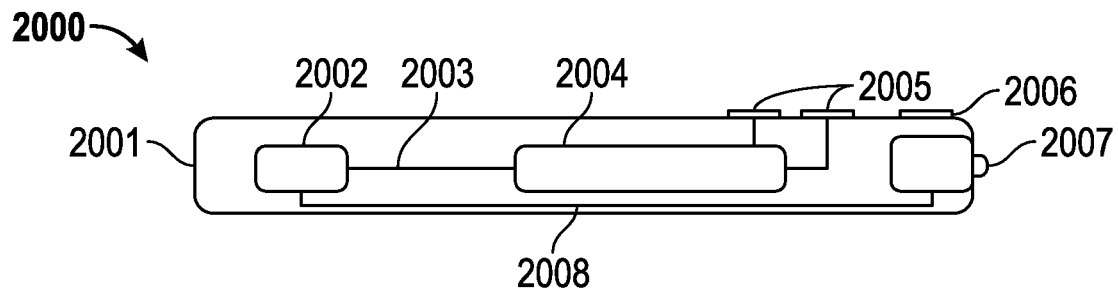

Another embodiment of the application is a cleaning device having additional functionality such as a remote control, laser pointer or the like. Turning to FIG. 20, a device 2000 including both a laser pointer and a remote control is shown. This device includes and a case, 2001, a battery 2002, a remote transmitter and/or receiver 2004 and a laser 2007. Power is provided to the remote over circuit 2003 and to the laser over circuit 2008. The remote device is controlled using the buttons shown at 2005. An off/on switch is provided for the laser at 2006 which actuates a switch on the top of the laser (not shown). This device may or may not include cleaning capabilities but will include a rare earth magnet or magnets such as are already disclosed. Ideally, the device may be deployed with an apparatus with which the additional functionality is complementary. For example, a laser pointer and a remote functionality for sending signals to a laptop computer to aid in providing visual aids during a conference presentation or lecture.

Capabilities that can be included with this embodiment include, but are not limited to: pointing devices such as a laser pointer; remote functionality such as a transmitter that can send mouse inputs to control a presentation; a wife hotspot, and the like. The remote function can be particularly useful for volume control, off/on switching, pause/play, and next/previous slide functionality.

Still other functionality that may be incorporated into such a device may include, but not be limited to a flash drive or other solid-state recording device, earplugs, Bluetooth earplugs, credit card reader, microphone, and the like.

In some embodiments, the devices of the application may be held in place using both magnetic and frictional forces. For the purposes of this, the term frictional forces includes those such as are obtained by including a ridge on a cleaning device that fits into a slot on a case. For example, a smart phone case having a slot which is configured to receive a cleaning device of the application wherein the cleaning device has a ridge that fits into that slot. By having both magnetic and frictional forces in play, such a cleaning device could be employed where it would otherwise be likely that the cleaning device would be separated from the smart phone case.

Also within the scope of the application are embodiments wherein the cleaning material is replaceable. In these embodiments, the cleaning material may be such that it is held in place by an adhesive or the cleaning material may be rigid and fit within a slot configured to receive it. This is true of any of the previously disclosed embodiments.

Figure 21:
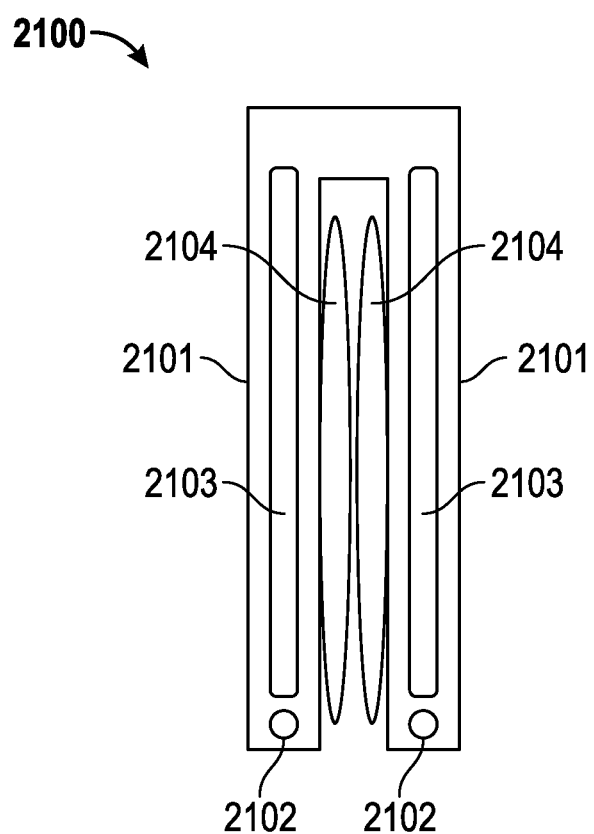
FIG. 21 illustrates a combination cleaner and glasses holder that is also buoyant.
Figure 22:
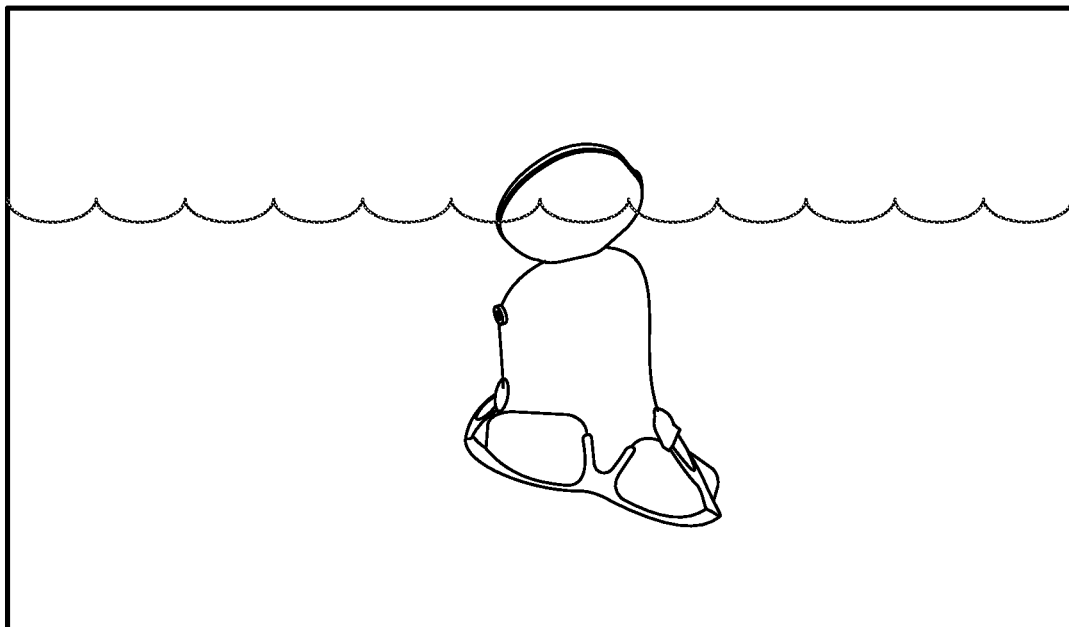
FIG. 22 is a photograph illustrating an example of a device as illustrated in FIG. 21 preventing a pair of glasses from sinking.

The cleaning devices of the application may be prepared using material that is foamed or otherwise buoyant. For example, in one application, a glasses holder can be configured to prevent a pair of glasses from sinking if dropped into water. For Example, in FIG. 21, a cleaning device 2100 is shown that has an outside cover 2101 and two cleaning surfaces within 2104. Within the outside cover are two foamed inserts 2103 and two magnets 2102 which function to hold the cover together when the cleaning device is not in use. FIG. 22 is a photograph showing such a device in use. Note that the cleaning device prevents the glasses from sinking.

Figure 23:
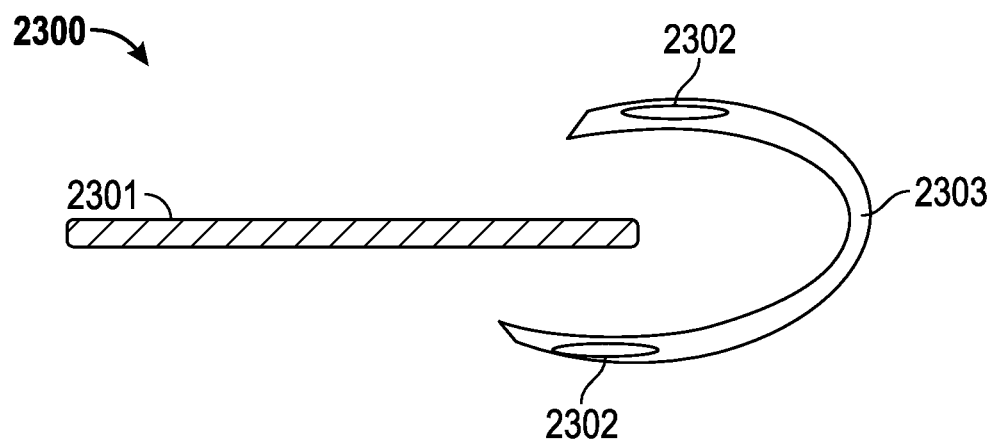
FIG. 23 is an illustration of an embodiment which may be used to affix objects to clothing.

Embodiments of the disclosure that are hourglass in shape may be prepared using exceptionally strong magnets. Turning to FIG. 23, these embodiments, in addition to being useful for cleaning lenses, may also be employed to affix items such as glasses, golf tees, flies for fly-fishing and other fish hooks, and the like to clothing and hats. The device 2300 is employed by opening the device and then placing the magnets 2302 on either side of a substrate like the sleeve or pocket of a shirt. The body of the cleaner, which is flexible, then "snaps" shut as the magnets divided only the thin material of the shirt or hat. By inserting a pen, pair of glasses or the like before bringing the magnets together, the item can be held in place. In one particularly useful embodiment, two such devices can be applied to the lens of a pair of glasses thereby protecting the lens from scratches and other perils of the environment.

In another embodiment, the cleaners of the application can be applied to a non-magnetic surface using an adhesive, a clamp, an elastic snap on design or the like.

The previous embodiment is just one example of how to prepare a buoyant cleaner. Any buoyant material can be employed in the making such an apparatus. For example the cleaning material themselves can be encapsulated around the buoyant core.

Many the features of the illustrated devices of the application can be employed on other embodiments. For example, the use of buoyant materials may be employed with cleaning devices such as those illustrated in FIGS. 13 and 14. Also, any of the embodiment of the application with sufficient internal volume, may include a reservoir for a cleaning fluid which may be dispensed as a spray or any other method known to those of ordinary skill in the art.

One embodiment of the invention is a switching device for use a portable electronic device having a view screen, a switch for turning the portable device off and on that can be activated or deactivated by the application of a magnetic field and at least one case. The term portable electronic device means such devices having a view screen including, but not limited to, tablet computers, laptop computers, portable DVD players, and the like.

The switching devices of the application selectively couple with the case or cases of the portable electronic devices. The term "selectively couple" describes the process wherein a switching device of the disclosure is applied to a portable electronic device and adheres to it because of a magnetic force. In one embodiment of the disclosure, there is sufficient magnetic force to allow the witching device to remain in place despite casual movements of the portable electronic device, but to still be easily removed by a human operator.

Figure 24:
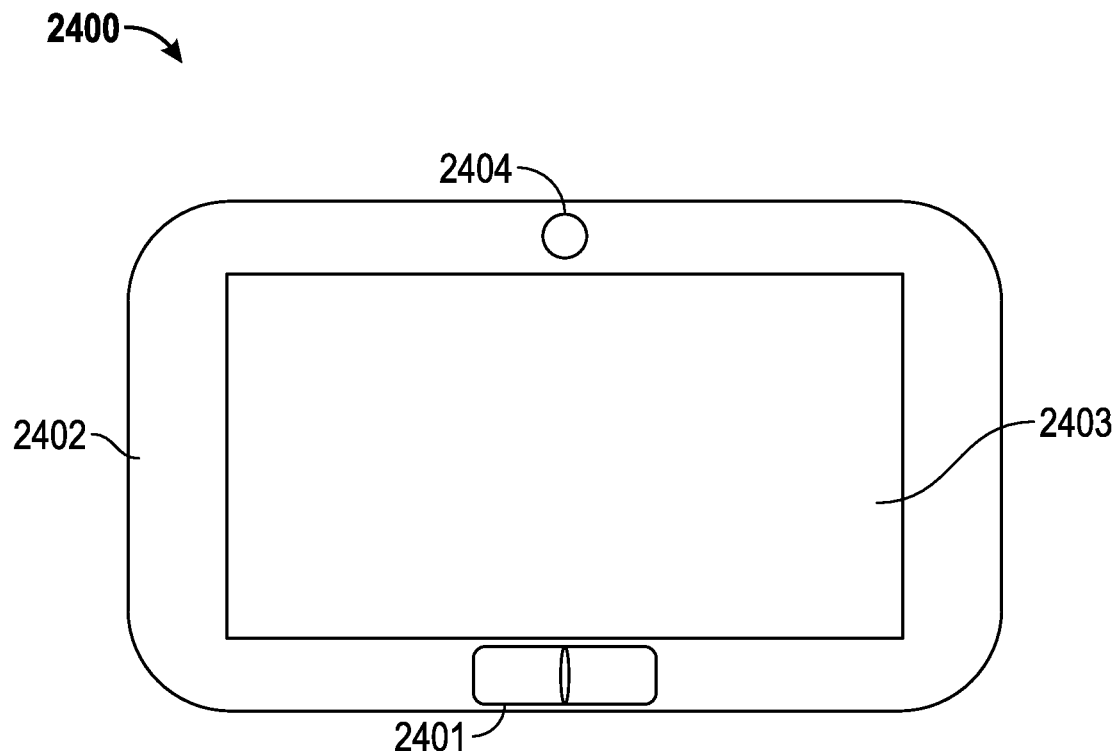
FIG. 24 is an illustration of a tablet computer and a switching device of the application.

Turning to FIG. 24, a front view of a portable electronic device, in this case a table computer (2400) is shown. As can be observed, the switching device (2401) is selectively coupled to the front of the portable electronic device 2402 outside of the view screen 2403. The magnetic switch is normally disposed with the portable electronic device but is shown here for illustration purposes (2404).

In employing the method of the application, the switching component may be picked up and, depending upon the model and functionality of the magnetic switch, the switching device is either applied directly to the magnetic switch or applied to either side of the switch and then slid past it to activate or deactivate the portable electronic device.

Figure 25:
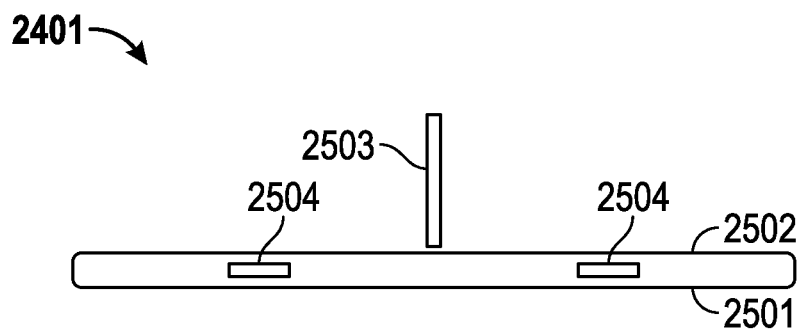
FIG. 25 illustrates a side view of a the switching device in FIG. 24.
Figure 26:
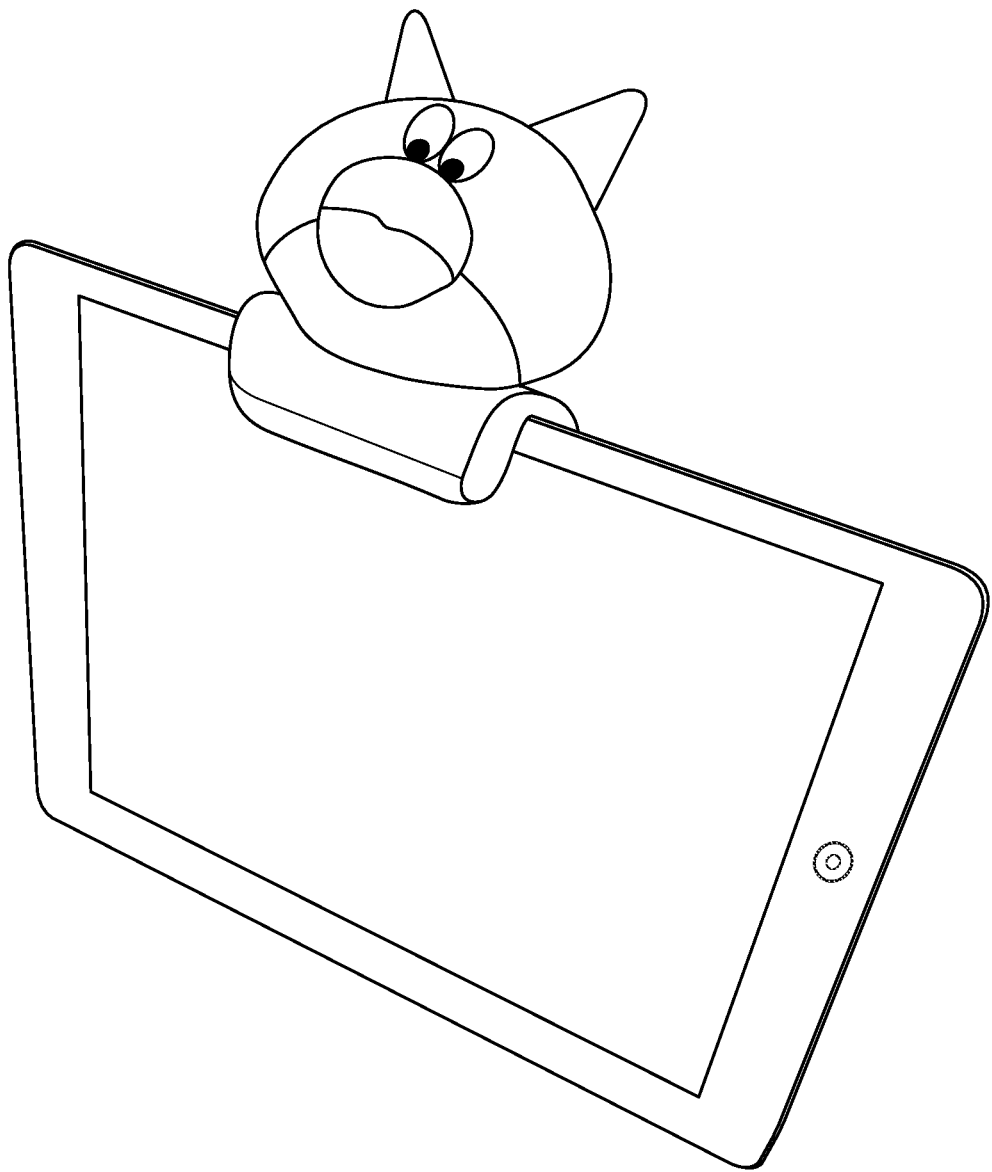
FIG. 26 is a photograph of a trademarked doll used as a component of the switching device of the disclosure, perched on an APPLE iPad.

Turning to FIG. 25, a side view of the switching device 2401 of FIG. 25 may be seen. The body of the switching device has a bottom surface (2501) and a top surface 2502. This particular embodiment has a tab (2503) on the top surface to facilitate its manipulation. Disposed within the switching device is a ferromagnetic or ferrimagnetic substrate (2504). In this embodiment, the bottom of the switching device is in contact with portable electronic device and is composed of a material that is not abrasive to the portable electronic device generally and the view screen in particular. Except for this limitation, the switching devices may be prepared with any material known to be useful to those of ordinary skill in the art for such applications.

In some embodiments, the switching device may include a tab that can be pinched to facilitate moving the switching device. In still another variation, in this latter embodiment, the tab may be constructed such that it can lie down in order to lower the profile of the switching device.

The dimensions of the switching device may vary according to its intended use. For some embodiments, length may range from about 12.5 cm to about 5 cm. In one embodiment, the length may be about 7 cm. Width may range from 1.5 cm to about 4 cm. In one embodiment, the width may be about 2 cm.

The overall shape of the switching device may be round, oval, rectangular, or square. In some embodiments, in order to avoid overlapping with a view screen, the switching device may be shaped to fit available space.

Another embodiment of the application invention is a small electronic device comprising a case, a view screen, and internal electronic components wherein the view screen and internal electronic components are mounted within the case. In this embodiment, the view screen is externally visible in at least one configuration of the case and the case has a surface that is substantially diamagnetic. At least a part of the surface of the case has been configured to receive a switching device. Further, the switching device is configured to selectively couple to the at least one part of the surface of the case that has been configured to receive the switching device; the at least one part of the surface of the case that has been configured to receive the switching device is ferromagnetic or ferrimagnetic or overlays a ferromagnetic or ferrimagnetic material.

It may be desirable, in some applications, to make the switching devices such that they have beveled edges. Such components could be particularly useful when coupled with devices having a case configured to accept the switching device wherein there is a ridge configured to accept the beveled edge to more securely hold it in place.

In embodiments of the disclosure where a case has been configured to receive a switching device, it may be so configured in several ways. In one embodiment, such a case is configured by placing a ferromagnetic or ferrimagnetic material onto the surface of the case where the switching device is received. In another embodiment, the case is prepared such that the case itself is composed of a ferromagnetic or ferrimagnetic material at the point where the switching device is received. In still another embodiment, the case is prepared by placing a ferromagnetic or ferrimagnetic material underneath where the switching device is received. Additionally, the case may be fabricated such that the switching device is received into a groove, slot, or other indented geometrical shape to lower the profile of the switching device to facilitate closing a cover or prevent snagging a switching device. Another reason to lower the profile that the switching device may be to enhance the aesthetics of the device.

In employing the method of the disclosure, the switching device is coupled to the base of, for example, a laptop computer by placing it within the invention. The magnetic attractive force between the permanent magnet and the ferromagnetic material holds the switching device in place as a laptop computer is moved. The switching device is decoupled from the laptop computer base by lifting it to overcome the magnetic force. The switching device is then placed on the view screen (not shown) and is then moved across the view screen using one or more fingers. After the device has been activated or deactivated, the switching device may be recoupled to the computer base.

Similarly, the method and apparatus of this disclosure may apply to a second case. In this embodiment, a case constructed to protect the primary case of a small electronic device may be similarly configured to receive a switching device. Such cases which are sometime manufactured by $3^{rd}$ party providers generally serve to protect the finish of the primary case and/or provide additional impact protection for the electrical components of the small electronic devices.

In practicing the method of the disclosure, there are three basic embodiments regarding the source of magnetic force used. In one embodiment, the switching device may include a magnet and the case may include an unmagnetized ferromagnetic or ferrimagnetic material. In a second embodiment, the switching device may have only an unmagnetized ferromagnetic or ferrimagnetic material and the magnet may be in or on the case. In the third embodiment, both the switching device and the case may include a magnet.

When a magnet or a ferromagnetic or ferrimagnetic material is applied to a case, in one embodiment, it may be adhered using a tacky adhesive. One such embodiment includes using double sided gaffer's tape as the source of the tacky adhesive. Any tacky adhesive can be used with the method of the application.

In one embodiment, the switching device of the application may be used as a source of advertising. For example, in one embodiment of the application, a switching device may have imprinted upon it a logo, trademark, slogan, or the like.

In another embodiment, a pre-printed substrate having a logo or decorative side, and optionally, a second adhesive side may be used. In some of these embodiments where the substrate includes an adhesive, it may be used to secure a magnet to the switching device. In another embodiment, the substrate having an adhesive may be free of advertisements and/or decoration.

In this application, the term diamagnetic is used to delineate materials that are not ferromagnetic or ferrimagnetic. From a practical perspective, the materials that are paramagnetic have such a weak attraction to magnets that they would not be effective if utilized and thus are to be treated as if they are diamagnetic.

While many of the switching device have a single magnet or ferromagnetic or ferrimagnetic substrate, this is not a limitation of the application. In some embodiments, it may be desirable to have multiple magnets in a switching device. In one example of a method of the application, the switching device is adhered to the top of a device having a case that closes, such as a laptop computer, with the body of the switching device rotated down when the case is closed. When the laptop is opened for use, the body can be rotated up and away from the screen.

The switching devices have a functionality of being able to active magnetic switches on devices having such switches. This is particularly useful in saving battery life as it does not require the cover of such devices to be closed (the normal mode for activation of such switches). In the use of tablet devices having a magnetic switch, the switching devices are particularly useful as the tablet can be put into hibernation mode with a single touch to the switching device as compared to the multiple touches required to do the same thing using the touch pad of the tablet.

In one embodiment where a switching device of the application is employed on a tablet using the Apple® Smart Cover, it may be employed on the outside of the smart cover to function as a handle for more easily manipulating the cover. Magnets at the bottom of the Smart Cover allow for a very efficient employment of the switching device.

The switching device of the disclosure, when prepared with especially strong magnets, can have a dual purpose of being a game component. For example, in an embodiment where a smart phone is within a case having a recessed area configured to receive a switching device, the recessed area and the switching device may be shaped to resemble a ball or other game object. If the switching device is tossed accurately, it will be attached into the recessed area and such a toss could be a goal or score. Any such game is within the scope of the invention.

In order to make the switching device more desirable to young users, they may be converted into or incorporated into dolls or toys with the caveat that the doll or toy is configured to be attached to or perched upon an electronic device and secured thereon using a magnet. While trademarked toys and dolls, such as Angry Birds™ doll in FIG. 3 may be used, even generic toys and dolls may be used, particularly if they will function to encourage proper maintenance of devices by, at least in some instances, young users. For example a Mini Beanie Baby™ from TY™ may be configured to sit upon a rectangular switching device wherein the switching device resembles a "rug." In another embodiment, covers and cases for electronic devices may be configured to resemble a cage or a house and an appropriately selected figure prepared using a nonabrasive material on at least one surface and at least one magnet. The figure/switching device could be adhered to the cover or case such that it appears to be using the cage/house. One example would be the use of a Snoopy™ shaped switching device on a case or cover having a doghouse design or shape. In another embodiment, a cartoon figure could be configured to sit upon (aka perch) upon the top of a case or cover being secured from falling by the magnet containing within the switching device.

The switching devices of the application have many advantages as compared to the conventional switching devices which are generally fixed within the covers of cases. The conventional switches often cannot be moved from side to side and usually block the view screen when employed. The switching devices of the application do not have these limitations. In fact, the switching devices of the application may be perched or attached to the front of a portable electronic device whether the device is off or on.

The switching devices of the application do not server as a cover, but this allows them to be of very low weight compared to the conventional covers/switches. Where a conventional case lacks a handle, the switching devices of the application may do double duty as a handle when the case, such as the Apple® Smart Case, is in place.

The cleaning materials that are employed in some of the embodiments of the application may be removable. For example, the cleaning devices illustrated in FIGS. 19A and 19B may be prepared with a cleaning material that 1903 that can be removed and replaced. While in some embodiment a tacky adhesive or other adhesive may be employed for the purpose of holding the cleaning material in place, because the device includes at least one magnet, a cleaning material that has been impregnated with iron particles (such as dust of filings) may be employed so that the magnet also serves to hold the cleaning material in place. In the alternative a metal foil could be used.

An adhesive can be selected to secure the impregnated metal particles of foil in place. The adhesive, in some embodiments, can function to protect the metal particles from corrosion as well as to prevent their escape. It would be desirable that especially metal particles such as iron dust of filings be secured and not escape onto surfaces being cleaned.

Some of the cleaning devices, such as those illustrated at FIG. 23, have secondary uses. For example, these devices may also be prepared with a surface made out a material suitable for holding fly fishing lures and other fishhooks. Where such a secondary use has been disclosed, then such devices, with or without the cleaning material are also within the scope of the application.

What is claimed is:

1. A system comprising:
   i) a portable switching device having a first case;
   ii) a portable electronic device having a second case with a lens or view screen, wherein:
      the portable switching device has embedded therein a magnet;
      a surface of the first case is configured to be non-abrasive to the lens or view screen;
      the portable switching device is configured to activate, actuate, deactivate, or send the portable electronic device into a power saving mode;
      the portable electronic device has a circuit that is activated, actuated, or deactivated by the portable switching device;
      the first case is configured to selectively couple to the second case employing magnetic force;
      the first case and the second case may decouple by overcoming magnetic force;
      the portable switching device is substantially disk shaped;
      the second case and the first case rotate or swivel while magnetically coupled; and
      the magnetic coupling of the portable switching device is circular with an outer diameter substantially the size of the portable switching device.

2. The system of claim 1, wherein the portable switching device has a tab or knob configured to be manipulated by pinched fingers.

3. The system of claim 1, where the portable switching device comprises a battery.

4. The system of claim 1, wherein the portable electronic device comprises a switch or sensor.

5. The system of claim 4, wherein the switch or sensor is responsive to the presence of the portable switching device.

6. The system of claim 5, wherein the circuit is responsive to the presence of the portable switching device.

7. The system of claim 4, wherein the portable switching device activates, actuates, or deactivates the sensor.

8. The system of claim 7, wherein the portable switching device activates or actuates a power saving mode in the portable electronic device.

9. The system of claim 1, wherein the portable electronic device comprises a member selected from the group consisting of cell phone, smart phone, gps, and tablet.

10. system of claim 1, wherein the circuit may be activated, actuated, or deactivated, by a magnetic field.

11. The system of claim 1, wherein the first case has a flexible material component that reduces shock.

12. The System of claim 1, wherein the portable switching device contains an electronic circuit.

13. The System of claim 1, wherein the portable switching device includes a wallet.

14. The System of claim 1, wherein the portable switching device includes a stand.

15. The System of claim 14, wherein the stand may lie down.

16. The System of claim 1, wherein the portable switching device includes wireless earbuds.

17. The System of claim 1, wherein the portable switching device includes a toy, doll, game, ball, lens, remote control, flash drive, solid state recording device, laser, or gps.

* * * * *